United States Patent
Kanai et al.

(10) Patent No.: US 8,374,021 B2
(45) Date of Patent: Feb. 12, 2013

(54) RANDOM NUMBER GENERATOR

(75) Inventors: Tatsunori Kanai, Yokohama (JP);
Masaya Tarui, Yokohama (JP); Yutaka Yamada, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/205,737

(22) Filed: Aug. 9, 2011

(65) Prior Publication Data
US 2012/0026784 A1  Feb. 2, 2012

Related U.S. Application Data

(63) Continuation of application No. PCT/JP2010/051878, filed on Feb. 9, 2010.

(30) Foreign Application Priority Data

Feb. 9, 2009 (JP) .................................. 2009-27637

(51) Int. Cl.
*G11C 11/00* (2006.01)
(52) U.S. Cl. ......................... 365/158; 365/171; 365/173
(58) Field of Classification Search .................. 365/158, 365/148, 171, 173
See application file for complete search history.

(56) References Cited

U.S. PATENT DOCUMENTS

| 2008/0007991 | A1 | 1/2008 | Diteweg et al. | |
| 2010/0131578 | A1* | 5/2010 | Fukushima et al. | 708/250 |
| 2011/0058406 | A1* | 3/2011 | Ma et al. | 365/148 |
| 2011/0123022 | A1* | 5/2011 | Oishi et al. | 380/46 |

FOREIGN PATENT DOCUMENTS

| JP | 2007-266301 | 10/2007 |
| JP | 2008-500718 | 1/2008 |
| WO | 2008/152845 A1 | 12/2008 |

OTHER PUBLICATIONS

International Preliminary Report on Patentability for International Application No. PCT/JP2010/051878 issued on Sep. 13, 2011.
Written Opinion for International Application No. PCT/JP2010/051878.
Fukushima, et al. Random number generator by current-induced magnetization reversal, Digest of the 31st Annual Conference on Magnetics in Japan, 2007.
International Search Report for International Patent Application No. PCT/JP2010/051878 mailed on Apr. 6, 2010.

* cited by examiner

*Primary Examiner* — Richard Elms
*Assistant Examiner* — Hien Nguyen
(74) *Attorney, Agent, or Firm* — Turocy & Watson, LLP

(57) ABSTRACT

According to an aspect of embodiments, there is provided a random number generating circuit including at least one magnetic tunnel junction (MTJ) element and a control circuit. The MTJ element comes into a high resistance state corresponding to a first logical value and also comes into a low resistance state corresponding to a second logical value different from the first logical value. The control circuit supplies the MTJ element with a first current for stochastically reversing the MTJ element from the high resistance state to the low resistance state when the MTJ element is in the high resistance state, and supplies the MTJ element with a second current for stochastically reversing the MTJ element from the low resistance state to the high resistance state when the MTJ element is in the low resistance state.

12 Claims, 24 Drawing Sheets

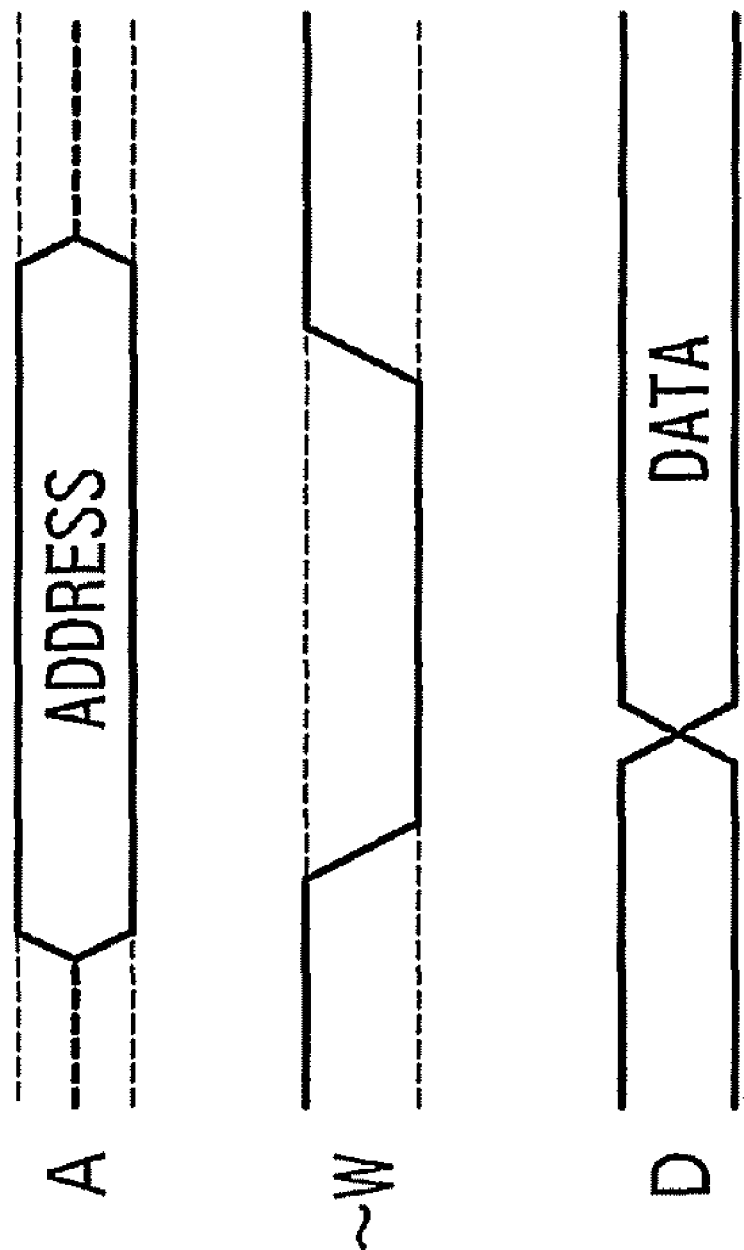

US 8,374,021 B2

RANDOM NUMBER GENERATOR

CROSS REFERENCE TO RELATED APPLICATIONS

This application is based upon and claims the benefit of PCT International Application PCT/JP2010/051878, filed on Feb. 9, 2010, which claims the benefit priority from the prior Japanese Patent No. 2009-27637, filed on Feb. 9, 2009.

FIELD

An embodiment of the present invention relates to a random number generator and a random number generating method which use spin-torque transfer magnetization switching.

BACKGROUND

A ferromagnetic tunnel junction (MTJ) element for use as a spin-torque transfer magnetic random-access memory (MRAM) has a configuration in which a tunnel barrier layer is sandwiched between two ferromagnetic layers. One of the ferromagnetic layers is a reference layer whose magnetization direction is fixed even when a current flows therethrough. The other ferromagnetic layer is a storage layer whose magnetization direction is variable when a current flows therethrough. The magnetization direction of the storage layer has two states. One state is correlated with a logical value "0" and the other state is correlated with a logical value "1", thereby allowing the MTJ element to be used as a memory cell.

Data is written into the MTJ element by spin-torque transfer magnetization switching. Specifically, the magnetization direction of the storage layer is reversed by a spin-transfer torque which is generated due to a write current caused to flow through the MTJ element. Changing the direction of the write current allows the magnetization direction to be reversed to one of the two states of the storage layer.

The MTJ element has a resistance value that varies depending on the magnetization direction of the storage layer. Data is read from the MTJ element in the following manner. That is, a small read current, with which no magnetization switching occurs, is caused to flow through the MTJ element and the resistance value thereof is measured to be determined as a low resistance value or a high resistance value.

When a pulse (herein referred to as "random number generating pulse") having an appropriately selected current value (herein referred to as "random number generating current") between a write current value, which causes magnetization switching, and a read current value, which does not cause magnetization switching, is caused to flow through the MTJ element, the magnetization can be reversed with a magnetization switching probability larger than 0.0 and smaller than 1.0. In this regard, "Random number generator by current induced magnetization switching" in Proceedings of the 31st annual conference on magnetics in Japan (2007) 13pC-15 (p. 214) (Fukushima, Kubota, Yakushiji, Yuasa, and Ando) discloses a technique in which a random number generating pulse having a current value with a magnetization switching probability to the high resistance state between 0.0 and 1.0 is caused to flow through the MTJ element which is reset to the low resistance state in advance, thereby making it possible to randomly change the state of the MTJ element and to use the MTJ element as a random number generator. The same effect can also be obtained as a matter of course by causing a random number generating pulse having a current value with a magnetization switching probability to the low resistance state between 0.0 and 1.0 to flow through the MTJ element which is reset to the high resistance state in advance. The current value with a magnetization switching probability between 0.0 and 1.0 is herein referred to as "a current for stochastically reversing a state".

The use of an MTJ element enables generation of random numbers with excellent characteristics based on natural phenomena. In this case, it is desirable to cause a current with a magnetization switching probability of 0.5 to flow so as to achieve a balance between the generated random numbers, i.e., so as to balance the probability of occurrence of "0" with the probability of occurrence of "1". However, the magnetization switching probability of the MTJ element with respect to a current value of a write pulse set during the design process is not always equal to 0.5 due to factors such as a variation in size of the produced MTJ element, for example. As a result, an imbalance occurs between the probability of occurrence of "0" and the probability of occurrence of "1".

An embodiment of the present invention provides a random number generator and a random number generating method, which are capable of suppressing an imbalance between random numbers due to variations upon random number generation using an MTJ element.

SUMMARY

According to an aspect of embodiments, there is provided a random number generating circuit including at least one magnetic tunnel junction (MTJ) element and a control circuit.

The MTJ element comes into a high resistance state corresponding to a first logical value and also comes into a low resistance state corresponding to a second logical value different from the first logical value.

The control circuit supplies the MTJ element with a first current for stochastically reversing the MTJ element from the high resistance state to the low resistance state when the MTJ element is in the high resistance state, and supplies the MTJ element with a second current for stochastically reversing the MTJ element from the low resistance state to the high resistance state when the MTJ element is in the low resistance state.

[An Effect by the Embodiment]

According to the embodiment, it is possible to suppress an imbalance between random numbers due to variations upon random number generation using an MTJ element.

BRIEF DESCRIPTION OF THE DRAWINGS

FIG. 32 is a timing diagram of signal lines at the time of instructing the random number generator shown in FIG. 31 to generate and read a random number.

DETAILED DESCRIPTION OF THE INVENTION

Figure 1:
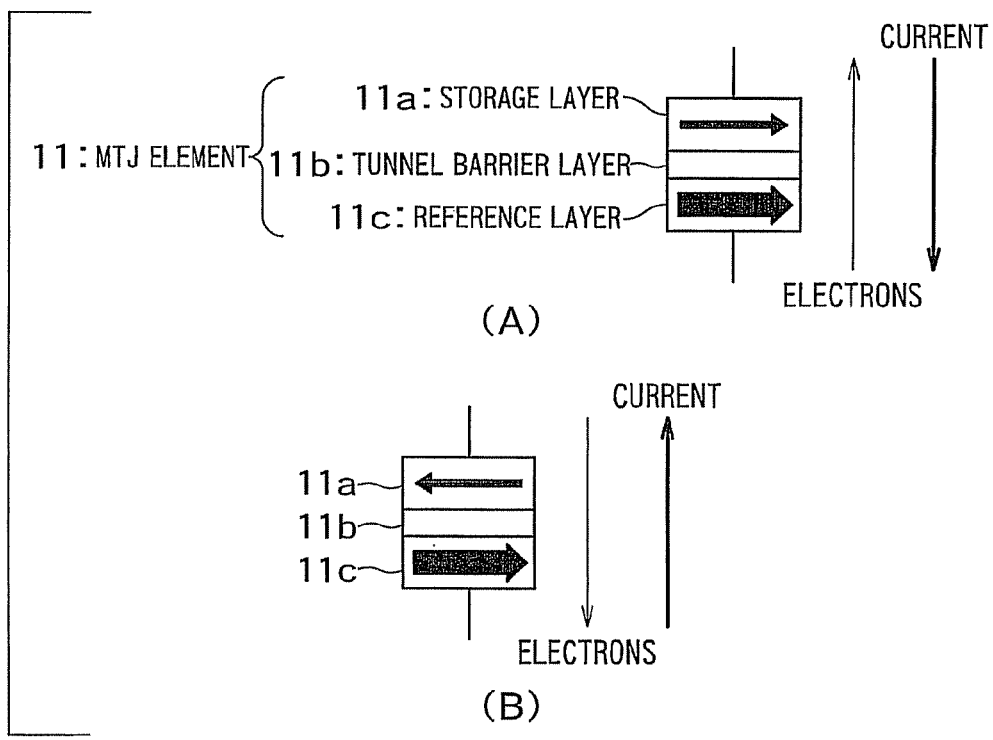
FIG. 1 is a diagram for explaining the configuration of an MTJ element.

FIG. 1 shows diagrams for explaining the configuration of an MTJ element.

An MTJ element 11 has a configuration in which a tunnel barrier layer 11b is sandwiched between a storage layer 11a and a reference layer 11c. The storage layer 11a and the reference layer 11c are ferromagnetic layers. The magnetization direction of the reference layer 11c is fixed even when a write current flows through the MTJ element 11. The magnetization direction of the storage layer 11a varies depending on the direction of the write current flowing through the MTJ element 11.

As shown in FIG. 1(A), for example, in the case where the magnetization of the reference layer 11c is fixed rightward, when a current of a write pulse is caused to flow from the storage layer 11a to the reference layer 11c, electrons flow from the reference layer 11c to the storage layer 11a through the tunnel barrier layer 11b. As a result, the magnetization direction of the storage layer 11a is changed to be identical with the magnetization direction (rightward in FIG. 1(A)) of the reference layer 11c. Thus, in the state where the magnetization direction of the storage layer 11a is identical with the magnetization direction of the reference layer 11c, the MTJ element 11 has a low resistance value.

Meanwhile, as shown in FIG. 1(B), when a current of a write pulse is caused to flow from the reference layer 11c to the storage layer 11a, electrons flow from the storage layer 11a to the reference layer 11c through the tunnel barrier layer 11b. As a result, the magnetization direction of the storage layer 11a changes in the direction (leftward in FIG. 1(B)) which is opposite to the magnetization direction of the reference layer 11c. Thus, in the state where the magnetization directions of the storage layer 11a and the reference layer 11c are opposite to each other, the MTJ element 11 has a high resistance value.

Thus, the MRAM has a configuration in which two states, i.e., the state where the magnetization directions of the storage layer 11a and the reference layer 11c are identical and the state where the magnetization directions thereof are opposite to each other, are correlated with logical values "0" and "1", respectively, thereby allowing the MTJ element 11 to be used as a memory. Assume herein that a low resistance state where the magnetization directions are identical is correlated with the logical value "0", and a high resistance state where the magnetization directions are opposite to each other is correlated with the logical value "1". Alternatively, the low resistance state may be correlated with the logical value "1" and the high resistance state may be correlated with the logical value "0". According to the present invention, a first logical value is one of the logical values "1" and "0", and a second logical value is the other of the logical values "1" and "0" which is different from the first logical value. The MTJ element 11 is configured to come into the high resistance state corresponding to the first logical value and also come into the low resistance state corresponding to the second logical value which is different from the first logical value.

The state of the MTJ element 11 can be read by causing a read current to flow therethrough to detect a resistance value. The value of the read current is set to be smaller than the value of the write pulse, thereby preventing the magnetization direction of the storage layer 11a of the MTJ element 11 from changing during reading processing.

FIG. 2(A) is a graph showing a relationship between a current value and a switching probability, in which the axis of abscissa represents a current value of a write pulse caused to flow through the MTJ element in the low resistance state, and the axis of ordinate represents a switching probability from the low resistance state to the high resistance state. FIG. 2(B) is a graph showing a relationship between a current value and a switching probability, in which the axis of abscissa represents a current value of a write pulse caused to flow through the MTJ element in the high resistance state, and the axis of ordinate represents a switching probability from the high resistance state to the low resistance state. The current flow direction when the MTJ element is reversed to the high resistance state is opposite to that when the MTJ element is reversed to the low resistance state. Accordingly, FIG. 2(A) shows that the absolute value of the current caused to flow increases toward the right from the origin, and FIG. 2(B) shows that the absolute value of the current caused to flow increases toward the left from the origin.

In the MRAM using the MTJ element as a memory cell, when the logical value "1" is written into the MD element, a write pulse having a current value with a switching probability to the high resistance state extremely close to 1.0, as indicated by $I_{W1}$ in FIG. 2(A), is caused to flow through the MTJ element. On the other hand, when the logical value "0" is written into the MTJ element, a write pulse having a current value with a switching probability to the low resistance state extremely close to 1.0, as indicated by $I_{W0}$ in FIG. 2(B), is caused to flow through the MTJ element. In the case of reading a value from the MTJ element, a current with a switching probability extremely close to 0.0, as indicated by $I_{R0}$ in FIG. 2(B) and $I_{R1}$ in FIG. 2(A), is caused to flow through the MTJ element to detect a resistance value. When a high resistance value is detected, the value is determined as "1", while when a low resistance value is detected, the value is determined as "0".

Figure 2:
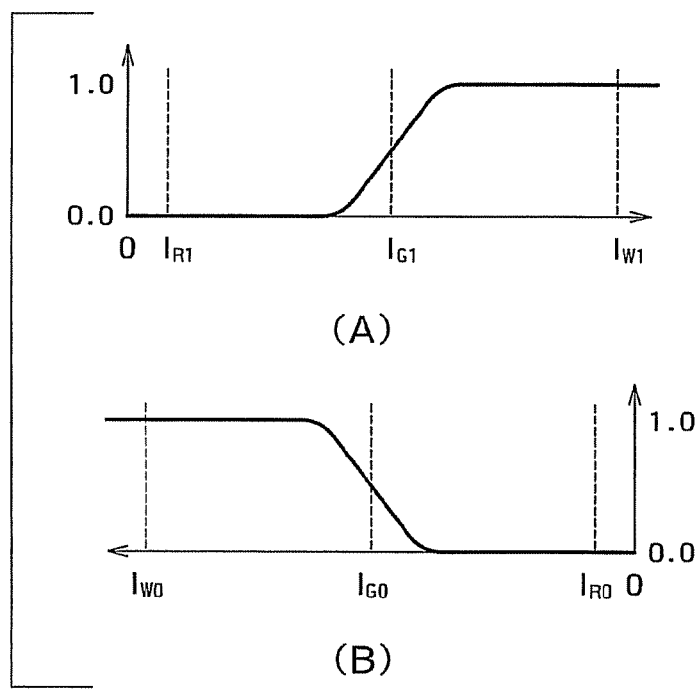
FIG. 2 shows graphs each showing a relationship between a current value and a switching probability.

As shown in FIG. 2, the switching probability in the state of the MD element does not abruptly change at a certain threshold but gradually changes within a certain range of current values. For this reason, when a random number generating pulse having a current value with a switching probability of about 0.5, as indicated by $I_{G1}$ in FIG. 2(A), is caused to flow through the MTJ element in the low resistance state, the MTJ element comes into the high resistance state at a probability of about 50%. Meanwhile, when a random number generating pulse having a current value with a switching probability of about 0.5, as indicated by $I_{G0}$ in FIG. 2(B), is caused to flow through the MTJ element in the high resistance state, the MTJ element comes into the low resistance state at a probability of about 50%.

Accordingly, a random number generating pulse having a current value with a switching probability from one state to another state of about 0.5 is caused to flow through the MTJ element, which is initialized to one of the low resistance state and the high resistance state. This allows the state of the MTJ element to be set to one of the low resistance state and the high resistance state at a probability of about 50%. Thus, the MTJ element can be used as a random number generator.

Figure 3:
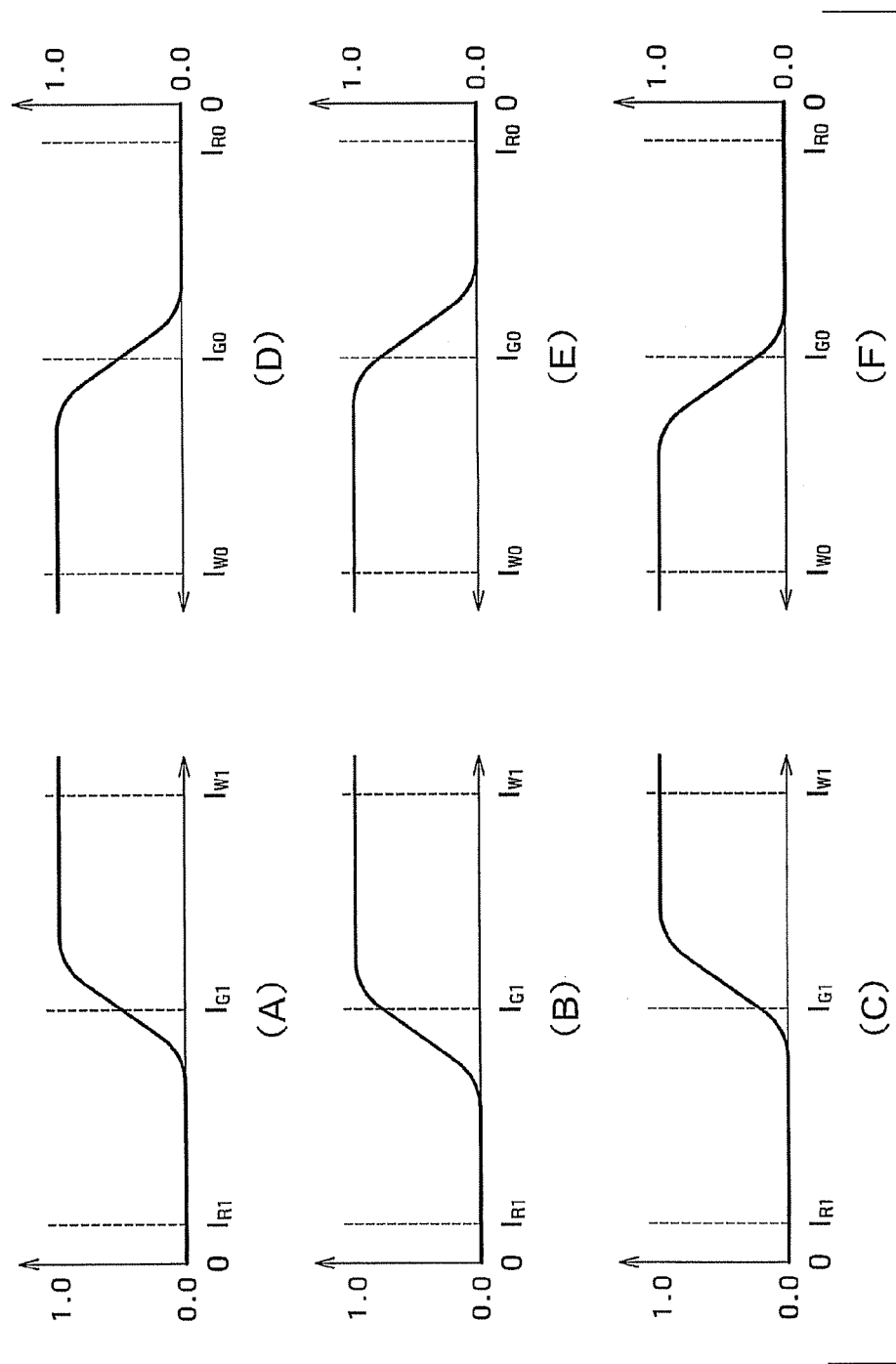
FIG. 3 shows graphs for explaining variations in characteristics of the MTJ element.

In actual production of an LSI chip using the MTJ element as a random number generator, variations may occur in characteristics of the MTJ element formed on the chip. As shown in FIG. 3(A), even when a random number generating pulse having the current value $I_{G1}$ with a switching probability from the low resistance state to the high resistance state of 0.5 is designed to be caused to flow through the MTJ element, the characteristics of the MTJ element also vary depending on the factors such as a variation in area of the MTJ element formed on the chip in the production step. Also with respect to the random number generating pulse having the same current value $I_{G1}$, the switching probability becomes larger than 0.5 as shown in FIG. 3(B) or becomes smaller than 0.5 as shown in FIG. 3(C). As a result, when the random number generating pulse having the current value $I_{G1}$ is caused to flow through the MTJ element to generate random numbers after the MTJ element is reset to the logical value "0" as in the related art, an imbalance occurs between the frequency of occurrence of the logical value "0" and the frequency of occurrence of the logical number "1" among the resulting random numbers.

The same holds true for the switching probability from the high resistance value to the low resistance value. As shown in FIG. 3(D), for example, even when a random number generating pulse having the current value $I_{G0}$ with a switching probability from the high resistance state to the low resistance state of 0.5 is designed to be caused to flow through the MTJ element, the switching probability becomes larger than 0.5 as shown in FIG. 3(E) or becomes smaller than 0.5 as shown in FIG. 3(F) with respect to the random number generating pulse having the same current value $I_{G0}$ due to variations.

In this case, if a shape factor is predominant among the factors for variations in characteristics of the MTJ element, there is a correlation between the switching probability from the low resistance state to the high resistance state and the switching probability from the high resistance state to the low resistance state. Specifically, assume that, as shown in FIG. 3(A), the current value $I_{G1}$ of the random number generating pulse is determined for a standard MTJ element so that the switching probability from the low resistance state to the high resistance state is set to 0.5. Also assume that, as shown in FIG. 3(D), the current value $I_{G0}$ of the random number generating pulse is determined for the standard MTJ element so that the switching probability from the high resistance state to the low resistance state is set to 0.5. At this time, in the MTJ element having characteristics as shown in FIG. 3(B), in which the switching probability from the low resistance state to the high resistance state with respect to the random number generating pulse having the current value $I_{G1}$ is higher than 0.5, the switching probability from the high resistance state to the low resistance state with respect to the random number generating pulse having the current value is also higher than 0.5 as shown in FIG. 3(E). Meanwhile, in the MTJ element having characteristics as shown in FIG. 3(C), in which the switching probability from the low resistance state to the high resistance state with respect to the random number generating pulse having a current value $I_{G1}$ is lower than 0.5, the switching probability from the high resistance state to the low resistance state of the random number generating pulse with respect to the current value $I_{G0}$ is also lower than 0.5 as shown in FIG. 3(F).

In the random number generation mode of the present invention, the correlation between the switching probability from the low resistance state to the high resistance state and the switching probability from the high resistance state to the low resistance state is used to reduce an imbalance between the generated random numbers "0" and "1". Specifically, when the present value of the MTJ element indicates the high resistance state (logical value "1"), the random number generating pulse having the current value $I_{G0}$ (first current) for stochastically reversing the state from the high resistance state to the low resistance state is caused to flow through the MTJ element. On the other hand, when the present value of the MTJ element indicates the low resistance state (logical value "0"), the random number generating pulse having the current value $I_{G1}$ (second current) for stochastically reversing the state from the low resistance state to the high resistance state is caused to flow through the MTJ element. This allows the state of the MTJ element to randomly change and to be used as a random number value.

In the random number generation mode of the related art, for example, the MTJ element is reset to the low resistance state (logical value "0") in advance and a random number generating pulse for stochastically reversing the state from the low resistance state to the high resistance state (logical value "1") is then caused to flow through the MTJ element. This allows the state of the MTJ element to randomly change. In this case, when the switching probability with respect to the current value of the random number generating pulse is larger than 0.5, the probability of occurrence of the random number value "1" also increases in proportion to the switching probability.

Meanwhile, in the mode of the present invention, the state of the MTJ element is stochastically reversed from the present state to another state without resetting the MTJ element to a specific state upon random number generation. Accordingly, even in the case where the switching probability with respect to the current value of the random number generating pulse for reversing the state from the low resistance state to the high resistance state is larger than 0.5, if the switching probability with respect to the current value of the random number generating pulse for correspondingly reversing the state from the high resistance state to the low resistance state is also larger than 0.5, the frequency of switching between the low resistance state and the high resistance state increases. At the same time, an imbalance between the probability of occurrence of "0" and the probability of occurrence of "1" among the generated random numbers can be reduced. On the contrary, even in the case where the switching probability with respect to the current value of the random number generating pulse for reversing the state from the low resistance state to the high resistance state is smaller than 0.5, if the switching probability with respect to the current value of the random number generating pulse for correspondingly reversing the state from the high resistance state to the low resistance state is also smaller than 0.5, the frequency of switching between the low resistance state and the high resistance state decreases. At the same time, an imbalance between the probability of occurrence of "0" and the probability of occurrence of "1" of the generated random numbers can be reduced.

The variations due to the production process include variations in characteristics of MTJ elements for each LSI chip in the production of a plurality of LSI chips each including the MTJ element, and variations in characteristics of MTJ elements when one LSI chip includes a plurality of MTJ elements. The mode of the present invention has an advantageous effect of reducing an influence on any of the variations.

Figure 4:
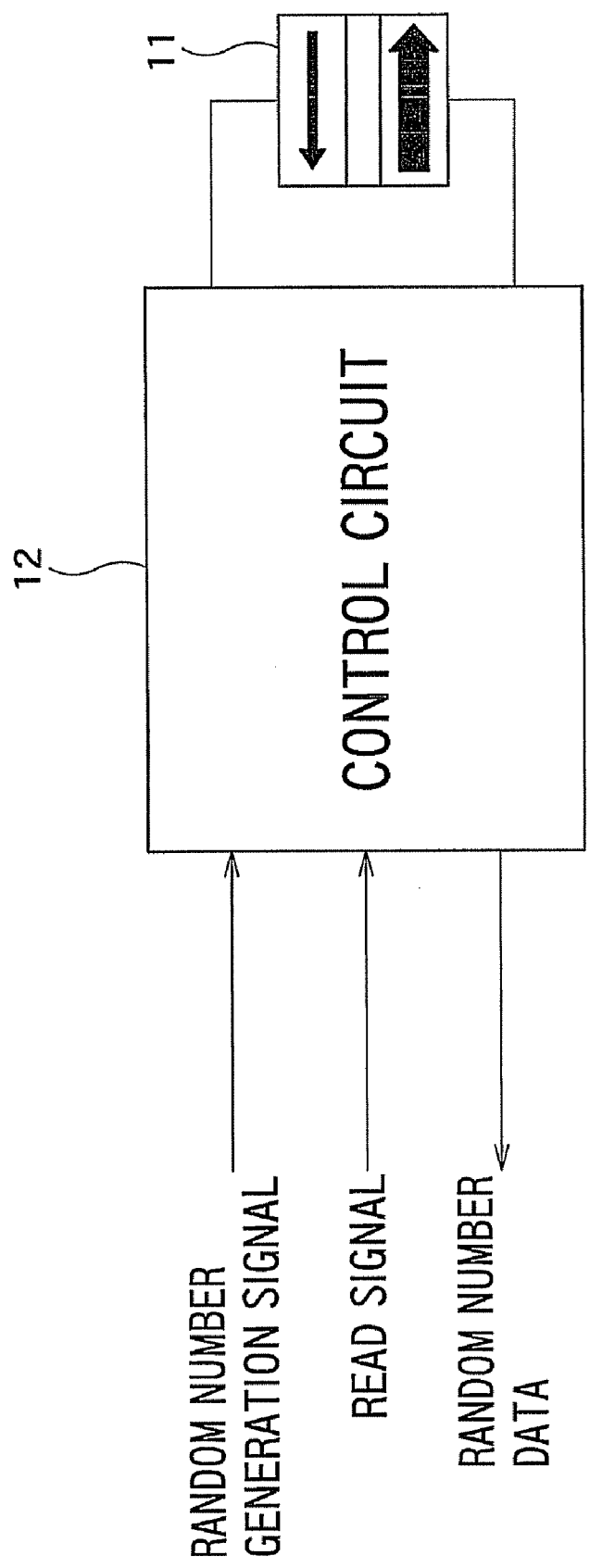
FIG. 4 is a diagram showing a random number generating circuit according to a first embodiment.

FIG. 4 shows an embodiment (first embodiment) of the present invention.

A random number generating circuit shown in FIG. 4 includes the MTJ element 11 for random number generation and a control circuit 12. The MTJ element 11 has one terminal on the side of the storage layer 11a, and the other terminal on the side of the reference layer 11c. The control circuit 12 has a first terminal connected to one terminal of the MTJ element 11, and a second terminal connected to the other terminal of the MTJ element 11. The control circuit 12 operates by receiving two types of signals, i.e., a random number generation signal and a read signal, from a circuit (external device) which is connected to the random number generating circuit and which uses the generated random numbers.

When the control circuit 12 receives the read signal, the control circuit 12 causes the read current to flow through the MTJ element 11 to check the resistance value. Then, when the MTJ element 11 is in the low resistance state, the control circuit 12 outputs the logical value "0" as random number data, and when the MTJ element 11 is in the high resistance state, the control circuit 12 outputs the logical value "1" as random number data. As described above, according to the present invention, the first logical value is one of the logical values "1" and "0", and the second logical value is the other of the logical values "1" and "0" which is different from the first logical value.

Figure 5:
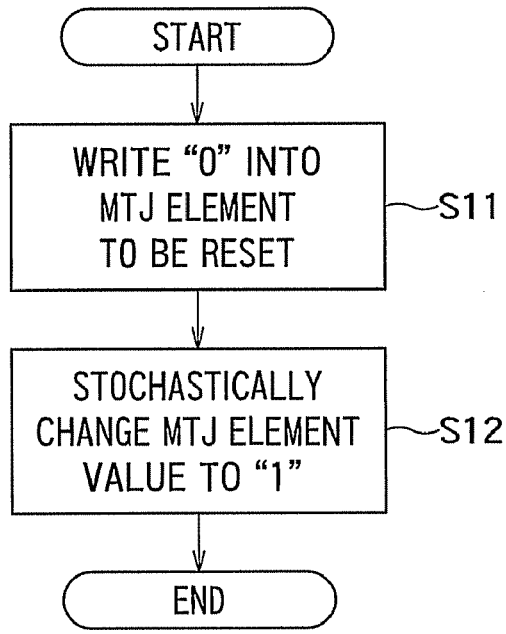
FIG. 5 is a flowchart showing a random number generating method of the related art.
Figure 6:
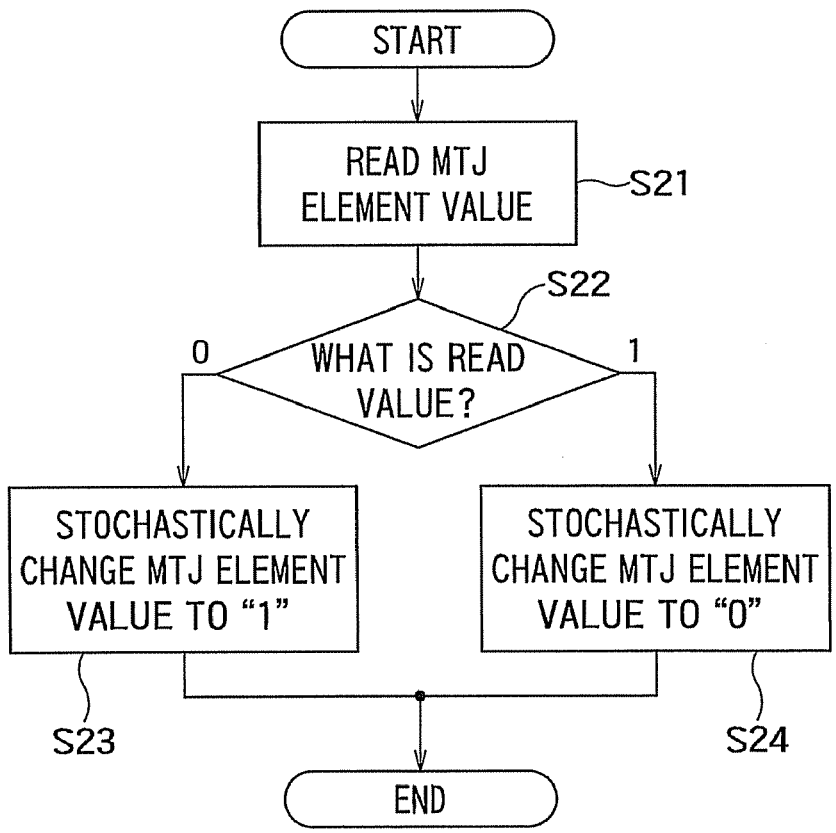
FIG. 6 shows operation of the random number generating circuit shown in FIG. 4.

FIG. 6 shows operation when the control circuit 12 receives the random number generation signal. FIG. 5 shows operation in the mode of the related art.

As shown in FIG. 5, in the mode of related art, a control circuit having received a random number generation signal from an external device first causes a write pulse for reversing the state from the high resistance state to the low resistance state to flow through an MTJ element, and resets the MTJ element to the low resistance state representing the logical value "0" (S11). Then, the control circuit causes a random number generating pulse for stochastically reversing the state from the low resistance state (logical value "0") to the high resistance state (logical value "1") to flow through the MTJ element, thereby randomly changing the state of the MTJ element (S12).

On the other hand, in the mode of the present invention, as shown in FIG. 6, the control circuit 12 having received the random number generation signal from the external device first causes the read current to flow through the MTJ element 11 to check the resistance value, thereby determining whether the present value is "0" or "1" (S21, S22). Then, when the read value is "0", the control circuit 12 causes the random number generating pulse (second current) for stochastically reversing the MTJ element from the low resistance state (logical value "0") to the high resistance state (logical value "1") to flow through the MTJ element (S23). Meanwhile, when the read value is "1", the control circuit 12 causes the random number generating pulse (first current) for stochastically reversing the MTJ element from the high resistance state (logical value "1") to the low resistance state (logical value "0") to flow through the MTJ element (S24). This allows the state of the MTJ element to randomly change.

The control circuit 12 can be implemented using a circuit similar to that implemented when the MTJ element is used as a memory. In other words, since the random number generating pulse is obtained such that the current value of the write pulse is changed to lower the magnetization switching probability to a value suitable for random number generation, the control circuit 12 may be designed so that the value of the current flowing through the MTJ element 11 is set to be different from the write pulse.

While the embodiment of FIG. 4 shows an example where the random number generating circuit includes one MTJ element, the random number generating circuit may include a plurality of MTJ elements so as to generate multi-bit random numbers. In this case, the control circuit 12 of the random number generating circuit having received the read signal may output in parallel the values of the plurality of MTJ elements included therein through a plurality of signal lines. Alternatively, the control circuit 12 may serially output the values with a small number of signal lines. More alternatively, the control circuit 12 may receive an address signal for designating an MTJ element, from which a value is to be read, among the plurality of MD elements, and may read the value from the MTJ element designated by the signal line. Also in the case of generating a random number upon receiving the random number generation signal, random number generating pulses may be caused to flow in parallel through the plurality of MTJ elements. Alternatively, the random number generating pulses may be caused to sequentially flow through the MTJ elements. More alternatively, the random number generating pulses may be caused to flow through an MTJ element designated by an address signal.

Figure 7:
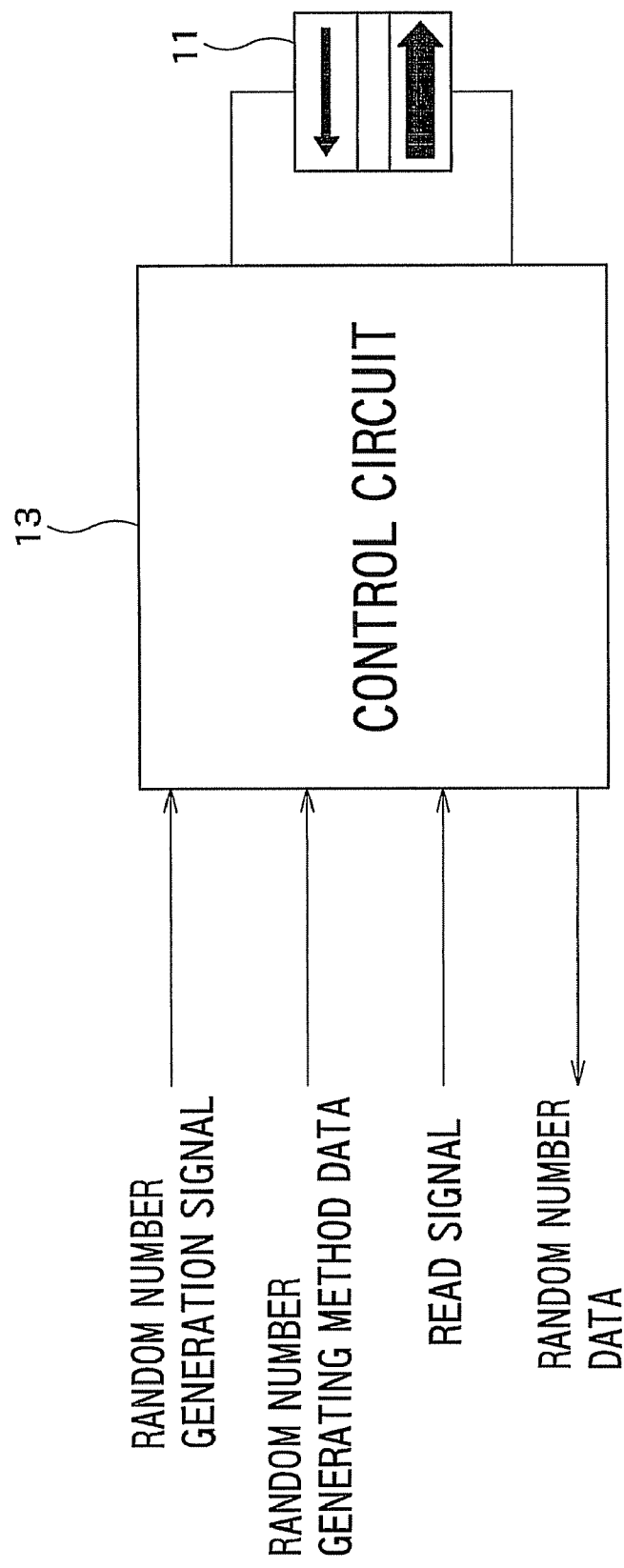
FIG. 7 is a diagram showing a random number generating circuit according to a second embodiment.

FIG. 7 shows another embodiment (second embodiment) which is obtained by modifying the embodiment shown in FIG. 4.

In the embodiment shown in FIG. 4, the control circuit 12 first reads the state of the MTJ element 11 upon random number generation, and the control circuit 12 then determines whether to cause the random number generating pulse for stochastically reversing the state to the high resistance state to flow, or to cause the random number generating pulse for stochastically reversing the state to the low resistance state to flow, depending on the state. FIG. 7 shows a method for making such a determination on the side of the external circuit (external device) that uses the random number generating circuit.

A control circuit 13 shown in FIG. 7 has a configuration in which a signal line for receiving method data for generating of a random number (hereinafter referred to as "random number generating method data") is added to the control circuit 12 shown in FIG. 6. The operation of the control circuit 13 shown in FIG. 7 at the time of reading the random number data is identical with that of the control circuit 12 shown in FIG. 6.

Figure 8:
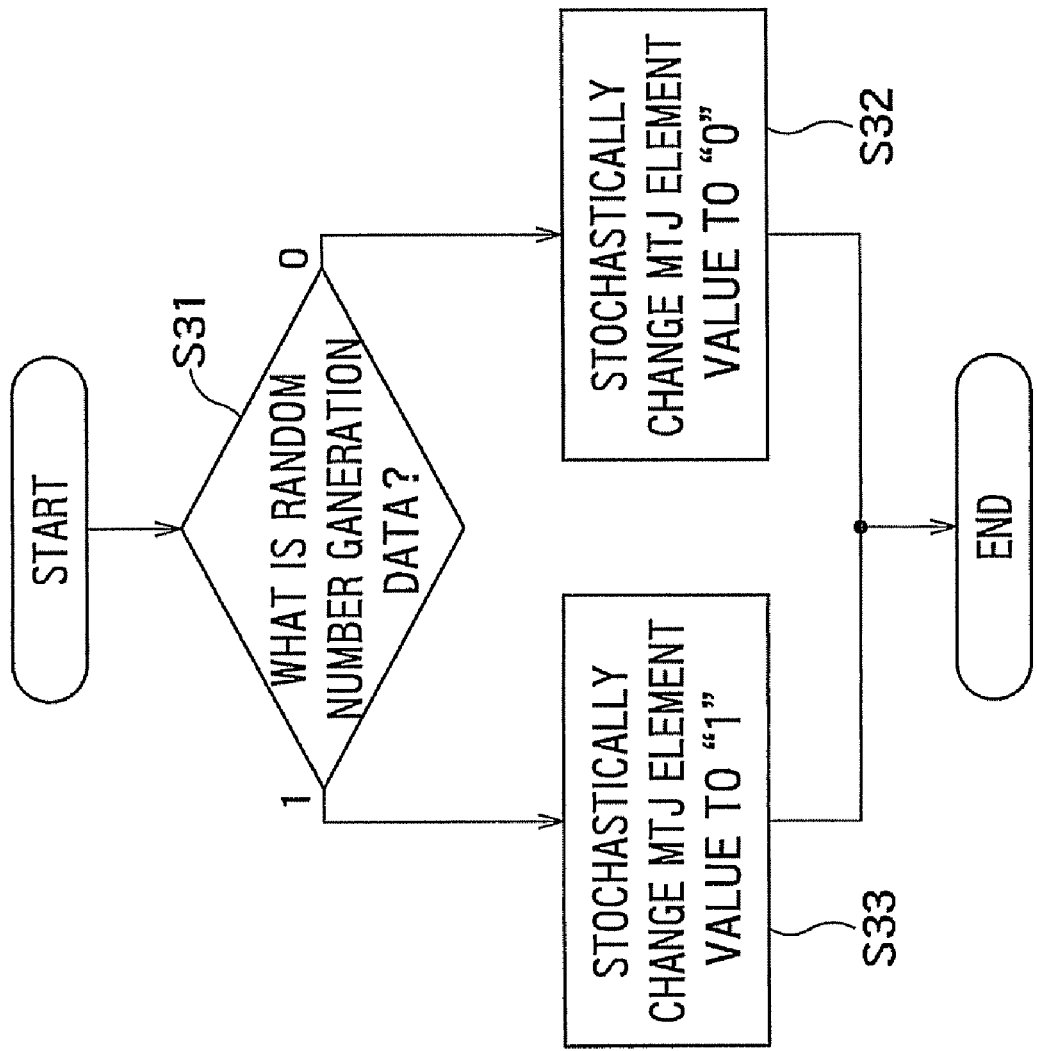
FIG. 8 is a flowchart showing operation of the random number generating circuit shown in FIG. 7.

On the other hand, the operation of the control circuit 12 of the random number generating circuit shown in FIG. 6 upon generation of a new random number is different from that of the control circuit 13 of the random number generating circuit shown in FIG. 7. Upon receiving the random number generation signal, the control circuit 13 of the random number generating circuit shown in FIG. 7 generates a random number in the process shown in FIG. 8. Specifically, the control circuit 13 receives the random number generating method data simultaneously with the random number generation signal (S31). When the value of the random number generating method data is "0", the control circuit 13 causes the random number generating pulse having the current value for stochastically reversing the MTJ element from the high resistance state (logical value "1") to the low resistance state (logical value "0") to flow through the MTJ element 11 (S32). Meanwhile, when the value is "1", the control circuit 13 causes the random number generating pulse having the current value for stochastically reversing the MTJ element 11 from the low resistance state (logical value "0") to the high resistance state (logical value "1") to flow through the MTJ element (S33).

Figure 9:
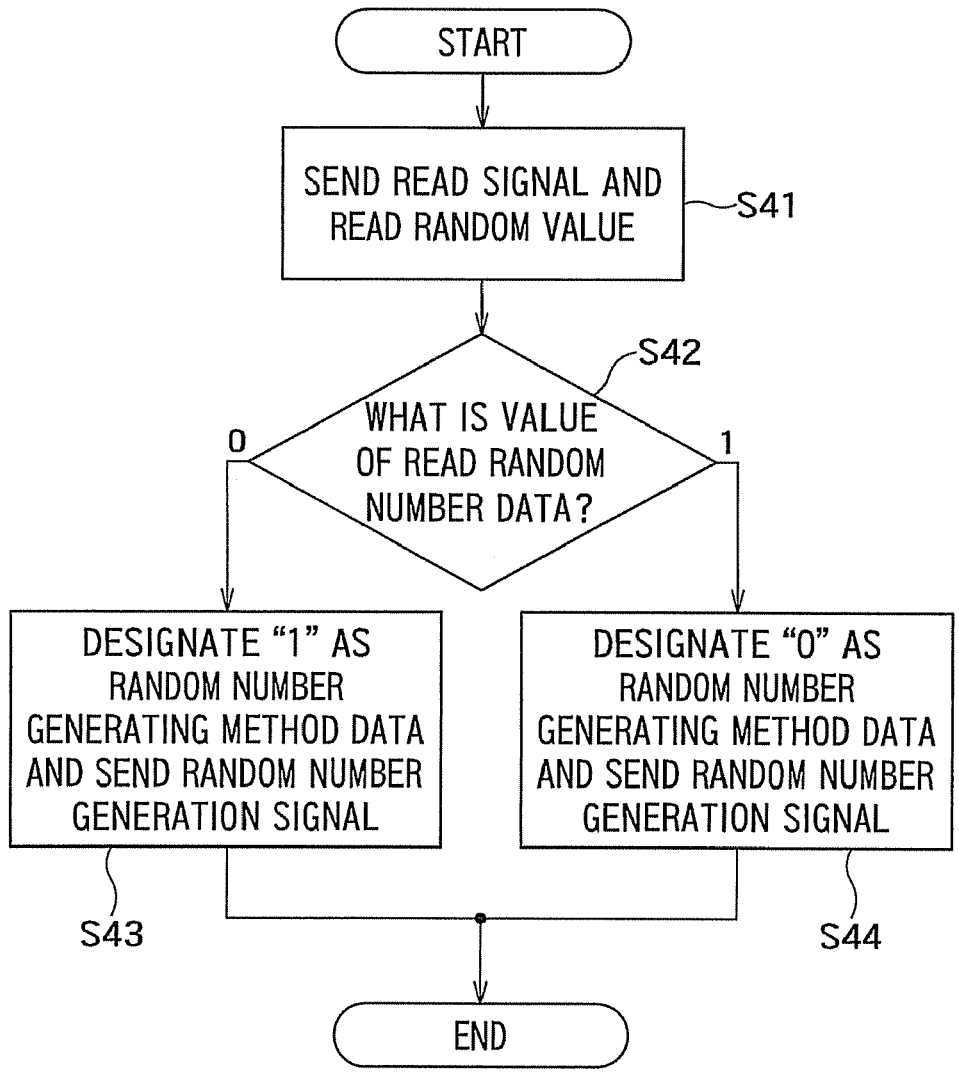
FIG. 9 is a flowchart showing operation of an external circuit that uses the random number generating circuit shown in FIG. 7.

The external circuit configured to use the random number generating circuit shown in FIG. 7 uses the random number generating circuit shown in FIG. 7 in the process shown in FIG. 9. First, the external circuit sends the read signal to the random number generating circuit to read the present value (S41) and checks the value (S42). Next, the external circuit generates random number generating method data including a logical NOT value of the read value, and sends the generated random number generating method data together with the random number generation signal. Specifically, when the read value is "0", the external circuit designates the random number generating method data as "1" (S43), and when the read value is "1", the external circuit designates the random number generating method data as "0" (S44). The external circuit sends the random number generating method data designated as "1" or "0", as well as the random number generation signal, to the random number generating circuit. This allows the state of the MTJ element 11 of the random number generating circuit to randomly change. After that, the external circuit can read the value of the newly generated random number by sending the read signal to the random number generating circuit.

This embodiment simplifies the configuration of the control circuit 13 as compared with the embodiment shown in FIG. 4. Specifically, when the control circuit 12 of the embodiment shown in FIG. 4 receives the random number generation signal to generate a random number, the process requires two steps: a step of reading the present state of the MTJ element 11; and a step of randomly changing the state by causing the random number generating pulse to flow through the MTJ element 11. Additionally, the process requires a storage element (a flip-flop or a register) for storing the state read in the first step to be used in the subsequent step. On the other hand, the control circuit 13 of the embodiment shown in FIG. 7 only requires processing for causing the random number generating pulse to flow through the MTJ element 11 to randomly change the state upon receiving the random number generation signal, without the need for reading and storing the present state of the MTJ element 11. This simplifies the configuration of the control circuit 13. That is, in the embodiment shown in FIG. 7, the processing for reading the present state to instruct random number generation according to the read state is removed from the processing performed by the random number generating circuit, and the processing is performed by the external circuit that uses the random number generating circuit. The external circuit reads a random number from the random number generating circuit and stores the value. Upon subsequent generation of a new random number, the external circuit designates the random number generating method data using the stored value, which enables effective operation.

A random number generating circuit including a plurality of MTJ elements can be implemented with a modified example similar to the modified example of the embodiment shown in FIG. 4. Further, when the random number generating circuit shown in FIG. 7 includes a plurality of MTJ elements, the circuit can be implemented such that a plurality of signal lines for the random number generating method data corresponding to the number of the MTJ elements provided in the random number generating circuit are prepared for random number generation of each MTJ element. Alternatively, the circuit may be implemented such that the number of signal lines for the random number generating method data may be set to be smaller than the number of MTJ elements, and the random number generating method data having the same number of bits as the number of MTJ elements may be serially input. More alternatively, the control circuit 13 may have an input for receiving an address signal for designating an MTJ element, for which a random number is to be generated, and the control circuit 13 may carry out random number generation with respect to the MTJ element designated by the address signal by application of the random number generating method data.

Note that in this embodiment (second embodiment), when the value of the random number generating method data is "0", the random number generating pulse having the current value for stochastically reversing the MTJ element from the high resistance state (logical value "1") to the low resistance value (logical value "0") is caused to flow through the MTJ element, and when the value of the random number generating method data is "1", the random number generating pulse having the current value for stochastically reversing the MTJ element from the low resistance state (logical value "0") to the high resistance state (logical value "1") is caused to flow through the MTJ element. Meanwhile, a modification may also be made in which when the value of the random number generating method data is "0", the random number generating pulse having the current value for stochastically reversing the MTJ element from the low resistance state (logical value "0") to the high resistance value (logical value "1") is caused to flow through the MTJ element, and when the value of the random number generating method data is "1", the random number generating pulse having the current value for stochastically reversing the MTJ element from the high resistance state (logical value "1") to the low resistance state (logical value "0") is caused to flow through the MTJ element. This modification eliminates the need to invert each bit in producing the random number generating method data from the read random number value. In other words, the read random number value can be directly used as the random number generating method data.

Next, a description will be made of an embodiment of a random number generating circuit in which a plurality of MTJ elements are integrated as in a typical memory. Prior to the description, a typical configuration of a spin-torque transfer MRAM that uses an MTJ element as a memory cell will be described.

Figure 10:
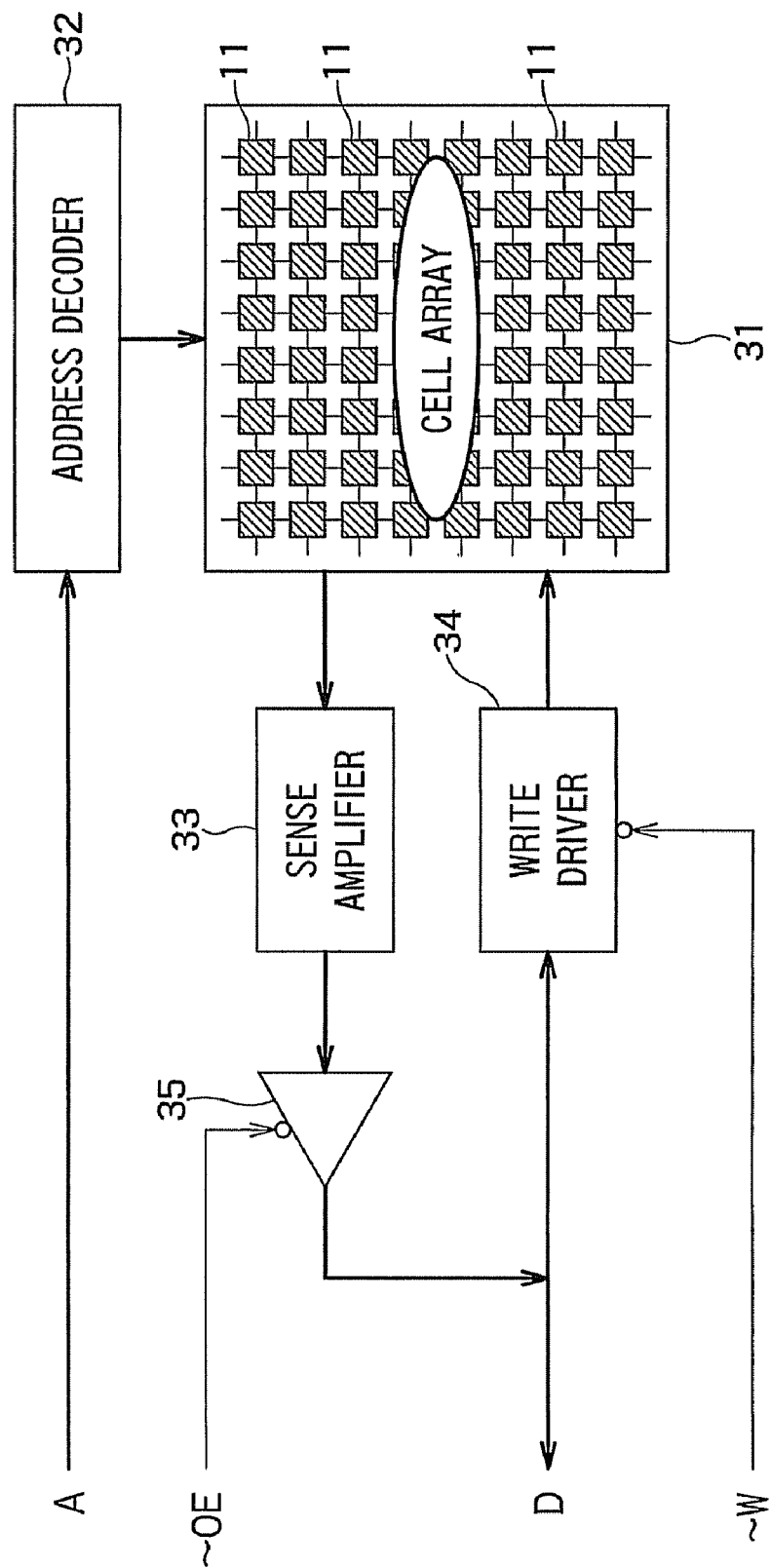
FIG. 10 is a diagram showing a typical configuration of a spin-torque transfer MRAM that uses an MTJ element as a memory cell.

FIG. 10 shows a typical configuration of a spin-torque transfer MRAM that uses an MTJ element as a memory cell. The MRAM having the configuration shown in FIG. 10 is connected to an external circuit with four types of signal lines: an address line (indicated by "A" in FIG. 10) for designating an address of a memory to read/write data; a data line (indicated by "D" in FIG. 10) for transferring the data to be read/written; a read signal line (indicated by "~OE" in FIG. 10) for instructing to read the content of the memory designated by the address line (A) and to output the read content to the data line (D); and a write signal line (indicated by "~W" in FIG. 10) for instructing to write the data designated by the data line (D) into the memory designated by the address line (A). The address line (A) is a multi-bit signal line corresponding to the number of MTJ elements 11 so as to select the plurality of MTJ elements 11 provided in the MRAM. The data line (D) is also a single signal line when the MRAM capable of simultaneously reading and writing one-bit data is used, but may be a multi-bit signal line when the MRAM capable of simultaneously reading and writing multi-bit data is used. Herein, each signal line denoted by the symbol "~" indicates "active low", i.e., indicates an instruction is sent when the logical value is "0". Instead of the "active low", "active high" may also be effective.

The MRAM includes a cell array 31, an address decoder 32, a sense amplifier 33, a write driver 34, and a tri-state buffer 35. The cell array 31 has an array structure in which the plurality of MTJ elements 11, each of which is used as a memory cell, are disposed at intersections between a plurality of word lines and a plurality of bit lines. The address decoder 32 is connected to the address line (A) and controls the word lines, as well as the bit lines as needed, of the cell array 31 so that the MTJ element 11 designated among the MTJ elements 11 of the cell array 31 by the address line (A) is selected as a read/write target. Upon receiving the write signal (~W), the write driver 34 writes the data flowing through the data line (D) at that time into the MTJ element 11 selected by the address line (A). The sense amplifier 33 reads the value written in the MTJ element 11 selected by the address line (A). Upon receiving a read signal (~OE), the tri-state buffer 35 sends the data sent from the sense amplifier 33 to the data line (D).

Figure 11:
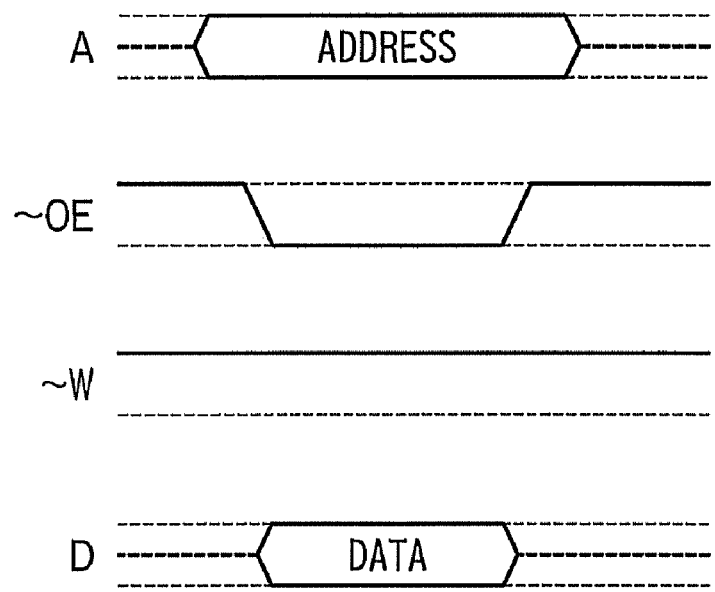
FIG. 11 is a timing diagram of signal lines at the time of reading data from the MRAM shown in FIG. 10.

FIG. 11 is a timing diagram of signal lines at the time of reading data from the MRAM shown in FIG. 10. When the external circuit (for example, a microprocessor) connected to the MRAM reads data from the MRAM, the external circuit first fixes the write signal (~W) to "1" and assigns an address to be read to the address line (A). Then, the external circuit changes the read signal (~OE) from "1" to "0" to instruct the MRAM to read data. As a result, a read current is caused to flow through the MTJ element designated by the address line (A) in the cell array 31 of the MRAM, and the sense amplifier 33 converts the current into a logical signal of 0/1 and outputs the data read to the data line (D) through the tri-state buffer 35 which is set to propagate the signal at the read signal (~OE). After that, when the read signal (~OE) is restored from "0" to "1", the tri-state buffer 35 interrupts propagation of the signal and the output thereof comes into the high-impedance state, so that the output of the data to the data line (D) is also interrupted.

Figure 12:
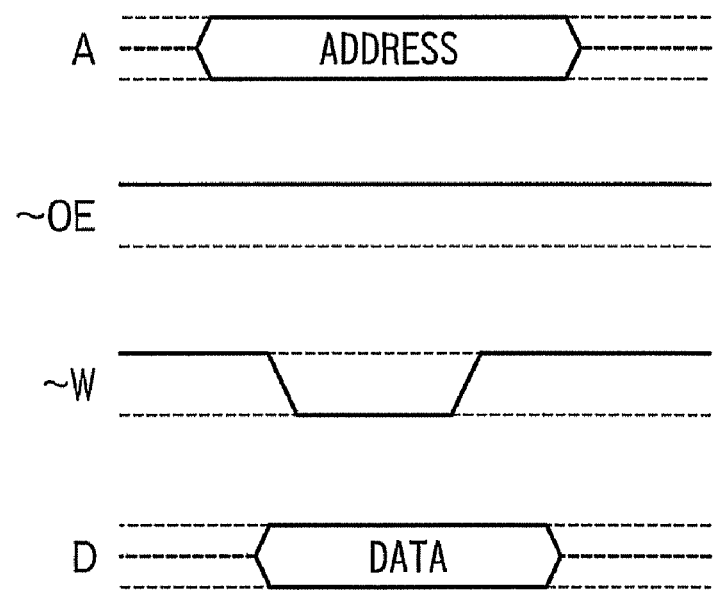
FIG. 12 is a timing diagram of signal lines at the time of writing data into the MRAM shown in FIG. 10.

FIG. 12 is a timing diagram of signal lines at the time of wiring data into the MRAM shown in FIG. 10. When the external circuit connected to the MRAM writes data into the MRAM, the external circuit first fixes the read signal (~OE) to "1", assigns an address to be written to the address line (A), assigns data to be written to the data line (D), and changes the write signal (r-W) from "1" to "0", thereby instructing the MRAM to write data. As a result, the write driver 34 writes the data designated by the data line (D) into the MTJ element designated by the address lines (A) in the cell array 31 of the MRAM. The write driver 34 writes the data into the MTJ element in the following manner. That is, a pulse of write current in the direction of reversing the MTJ element from the high resistance state (corresponding to the logical value "1") to the low resistance state (corresponding to the logical value "0") is caused to flow through the MTJ element for which the logical value "0" to be written is designated by the data line. Meanwhile, a pulse of write current in the direction of reversing the MTJ element from the low resistance state (corresponding to the logical value "0") to the high resistance state (corresponding to the logical value "1") is caused to flow through the MTJ element for which the logical value "1" to be written is designated by the data line. The write signal (~W) is restored from "0" to "1", thereby terminating the write processing.

Figure 13:
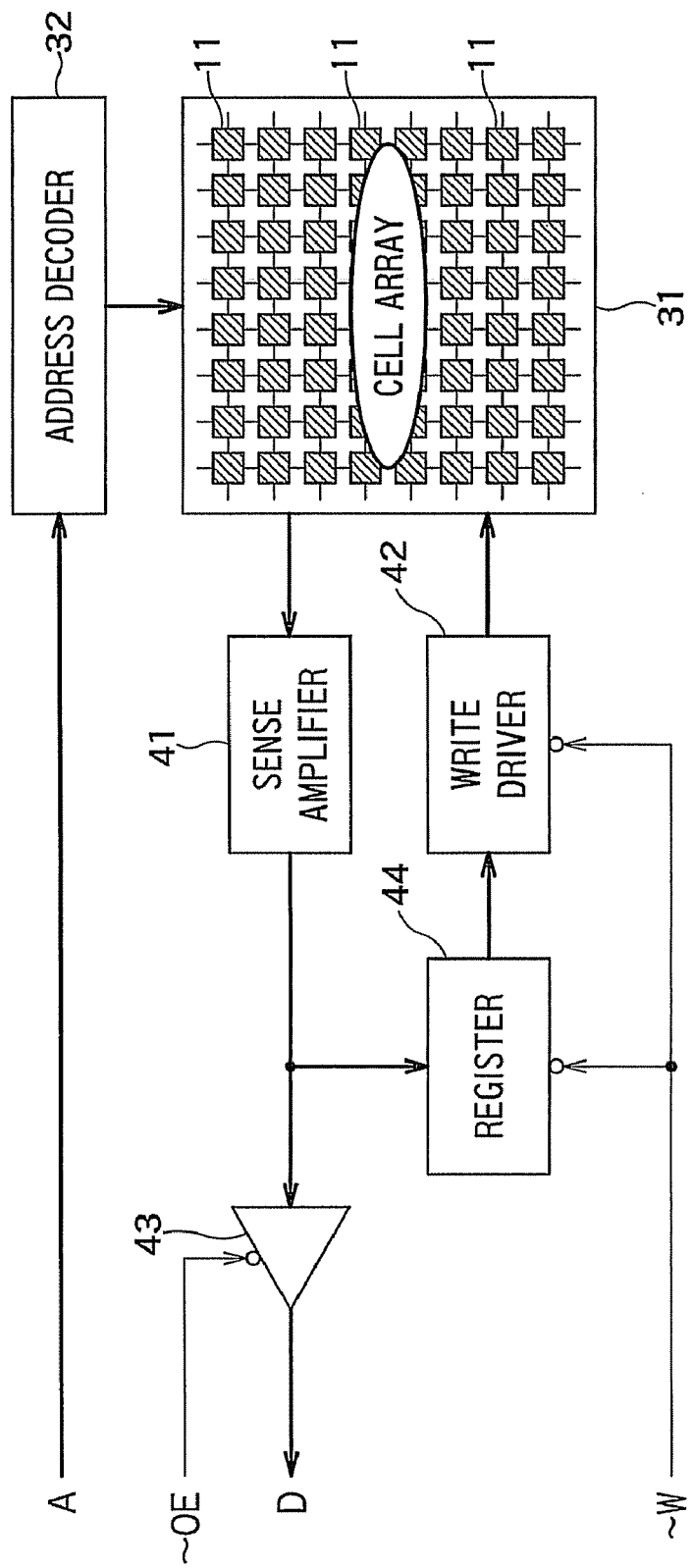
FIG. 13 is a diagram showing a random number generating circuit according to a third embodiment.

FIG. 13 shows another embodiment (third embodiment) for implementing a random number generator by modifying the MRAM shown in FIG. 10. Only the current value of the write pulse is different between the case where the MTJ element is used for the MRAM and the case where the MTJ element is used for the random number generator. Accordingly, the random number generator can also be achieved with a circuit configuration similar to that of the spin-torque transfer MRAM shown in FIG. 10. The configuration obtained by modifying the MRAM facilitates connection between the random number generator and a microprocessor and the like. Furthermore, integration of a large number of MTJ elements enables various applications such as an application requiring generation of a large amount of random numbers, an application requiring generation of random numbers at high speed, and an application requiring generation of random numbers with more favorable characteristics by a combination of a large number of natural random number sources.

The random number generator shown in FIG. 13 is connected to the external circuit with four types of signal lines: an address line (indicated by "A" in FIG. 13) for designating an address of an MTJ element for random number generation; a data line (indicated by "D" in FIG. 13) for reading a random number value; a read signal line (indicated by "~OE" in FIG. 13) for instructing to read the state of the MTJ element designated by the address line (A) and to output the read state to the data line (D); and a random number generation signal line (indicated by "~W" in FIG. 13) for instructing the MTJ element designated by the address line (A) to generate a new random number value. The address line (A) is a multi-bit signal line corresponding to the number of MTJ elements 11 so as to select the plurality of MTJ elements 11 provided in the random number generator. The data line (D) is also a single signal line when the random number generator capable of simultaneously reading one-bit random number values is used, but may be a multi-bit signal line when the random number generator capable of simultaneously reading multi-bit random number values is used. When the data line (D) is a multi-bit signal line, the data line handles multi-bit signals in parallel by use of a plurality of sense amplifiers and write drivers.

The random number generator includes the cell array 31, the address decoder 32, a sense amplifier 41, a write driver 42, a tri-state buffer 43, and a register 44. The cell array 31 has an array structure in which the plurality of MTJ elements 11 for random number generation are disposed at intersections between a plurality of word lines and a plurality of bit lines. The address decoder 32 is connected to the address line (A) and controls the word lines, as well as the bit lines as needed, of the cell array 31 so that the MTJ element designated among the MTJ elements 11 of the cell array 31 by the address line (A) is selected as a target for reading a random number value or a target for random number generation. The sense amplifier 41 reads a random number value written in the MTJ element selected by the address line (A). Upon receiving the read signal (~OE), the tri-state buffer 43 sends to the data line (D) the random number value sent from the sense amplifier 41. The tri-state buffer 43 includes a second reception unit of the present invention which is configured to receive the read signal (~OE), and an output unit that outputs the random number value (logical value) read by the sense amplifier 41. Upon receiving the random number generation signal (~W), the register 44 stores the random number value sent from the sense amplifier 41. Upon receiving the random number generation signal (~W), the write driver 42 causes a random number generating pulse for stochastically reversing the present random number value of the MTJ element, which is stored in the register 44, to flow through the MTJ element selected by the address line (A), thereby randomly changing the state of the MTJ element and generating a new random number. Each of the register 44 and the write driver 42 includes a first reception unit of the present invention which is configured to receive the random number generation signal (~W).

Figure 14:
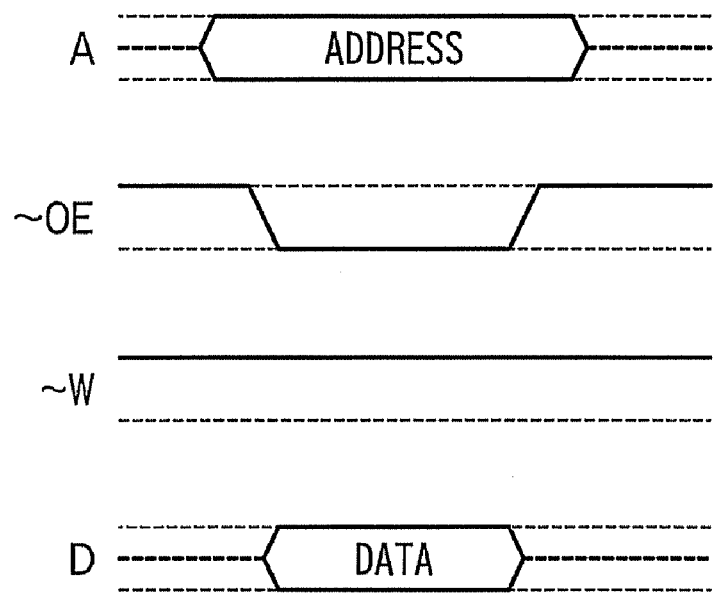
FIG. 14 is a timing diagram of signal lines at the time of reading a random number value from the random number generator shown in FIG. 13.

FIG. 14 is a timing diagram of signal lines at the time of reading a random number value from the random number generator shown in FIG. 13. When the external circuit (for example, a microprocessor) connected to the random number generator reads data from the random number generator, the external circuit first fixes the random number generation signal (~W) to "1", assigns an address of an MTJ element to be read to the address line (A), and changes the read signal (~OE) from "1" to "0", thereby instructing the random number generator to read data. As a result, the address decoder 32 causes the read current to flow through the MTJ element designated by the address line (A) in the cell array 31 of the random number generator, and the sense amplifier 41 converts the current into a logical signal of 0/1 and outputs the data read to the data line (D) through the tri-state buffer 43 which is set to propagate the signal at the read signal (~OE). After that, when the read signal (~OE) is restored from "0" to "1", the tri-state buffer 43 interrupts propagation of the signal and the output thereof comes into the high-impedance state, so that the output of the data to the data line (D) is also interrupted. This reading process is similar to the process for reading the data from the MRAM.

Figure 15:
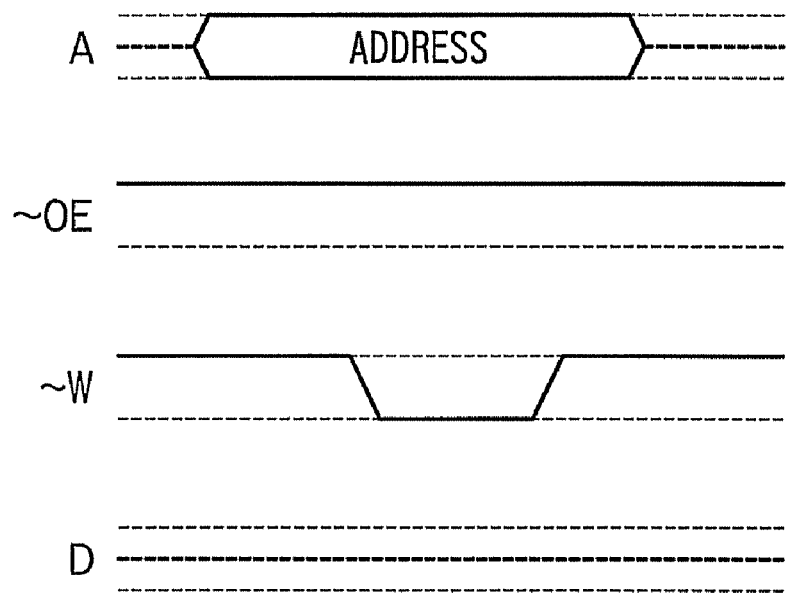
FIG. 15 is a timing diagram of signal lines at the time of causing the random number generator shown in FIG. 13 to generate a new random number.

FIG. 15 is a timing diagram of signal lines at the time of causing the random number generator shown in FIG. 13 to generate a new random number. When the external circuit connected to the random number generator instructs the random number generator to perform random number genera- tion, the external circuit first fixes the read signal (~OE) to "1", assigns an address of an MTJ element, for which a random number is to be generated, to the address line (A), and changes the random number generation signal (~W) from "1" to "0", thereby instructing the random number generator to perform random number generation. As a result, the address decoder 32 first causes the read current to flow through the MTJ element designated by the address line (A) in the cell array 31 of the random number generator, and the sense amplifier 41 converts the current into a signal having the logical value of 0/1. The value thus obtained is stored into the register 44. Then, the write driver 42 causes the MTJ element, which is designated by the address line (A) in the cell array 31 of the random number generator, to generate a random num- ber based on the value stored in the register. The write driver 42 causes the MTJ element to generate a random number in the following manner. That is, a pulse of random number generating current in the direction of stochastically reversing the MTJ element from the low resistance state (corresponding to the logical value "0") to the high resistance state (corre- sponding to the logical value "1") is caused to flow through the MTJ element when the present random number value stored in the register 44 is "0". Meanwhile, a pulse of random number generating current in the direction of stochastically reversing the MTJ element from the high resistance state (corresponding to the logical value "1") to the low resistance state (corresponding to the logical value "0") is caused to flow through the MTJ element when the present random number value stored in the register 44 is "1". The random number generation signal (~W) is restored from "0" to "1", thereby terminating the random number generation processing.

Figure 16:
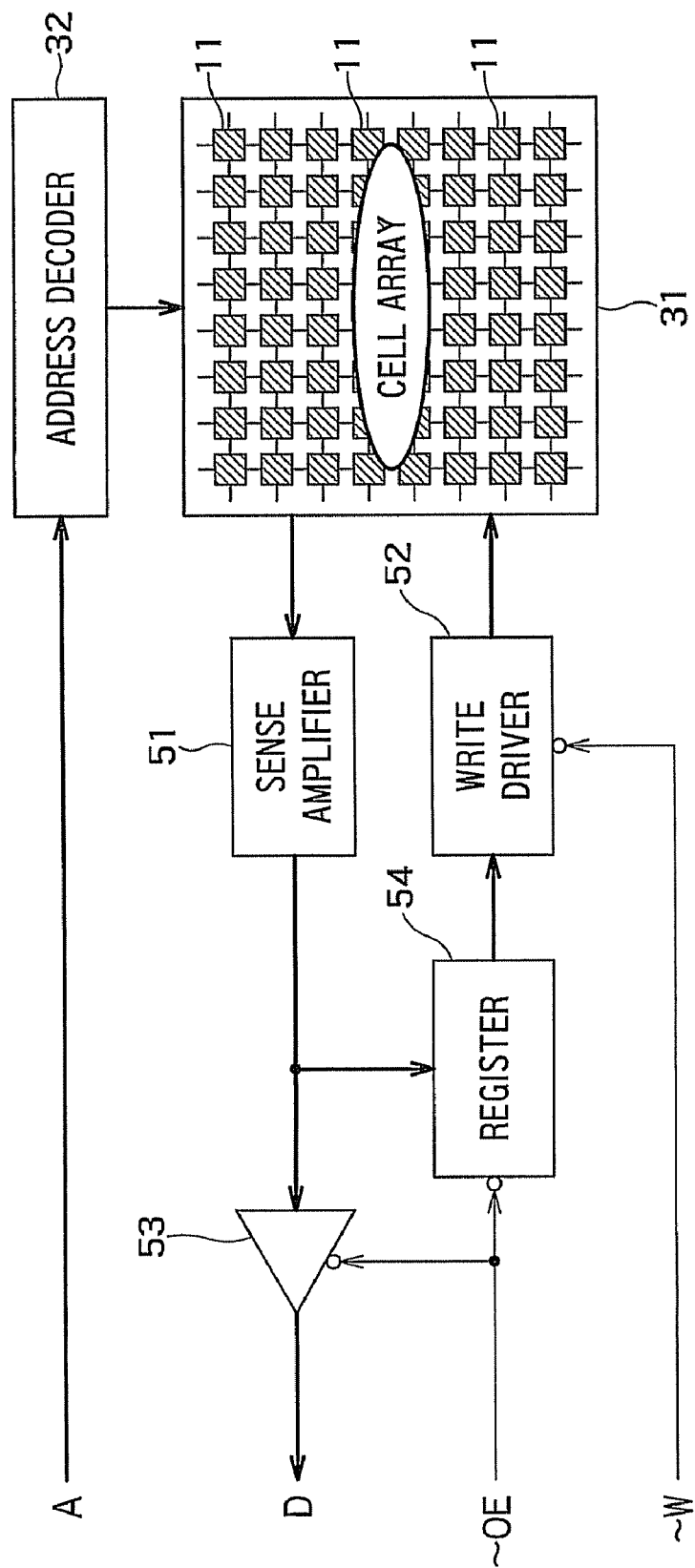
FIG. 16 is a diagram showing a random number generator according to a fourth embodiment.

FIG. 16 shows still another embodiment (fourth embodi- ment) of the random number generator.

The random number generator shown in FIG. 16 is con- nected to the external circuit with four types of signal lines: an address line (indicated by "A" in FIG. 16) for designating an address of an MTJ element for random number generation; a data line (indicated by "D" in FIG. 16) for reading a value of a random number; a read signal line (indicated by "~OE" in FIG. 16) for instructing to read the state of the MTJ element designated by the address line (A) and to output the read state to the data line (D); and a random number generation signal line (indicated by "~W" in FIG. 16) for instructing the MTJ element designated by the address line (A) to generate a new random number value. The address line (A) is a multi-bit signal line corresponding to the number of MTJ elements so as to select the plurality of MTJ elements 11 provided in the random number generator. The data line (D) is also a single signal line when the random number generator capable of simultaneously reading one-bit random number values is used, but may be a multi-bit signal line when the random number generator capable of simultaneously reading multi-bit random number values is used. When the data line (D) is a multi-bit signal line, the data line handles multi-bit signals in parallel by use of a plurality of sense amplifiers and write drivers.

The random number generator includes the cell array 31, the address decoder 32, a sense amplifier 51, a write driver 52, a tri-state buffer 53, and a register 54. The cell array 31 has an array structure in which the plurality of MTJ elements 11 for random number generation are disposed at intersections between a plurality of word lines and a plurality of bit lines. The address decoder 32 is connected to the address line (A) and controls the word lines, as well as the bit lines as needed, of the cell array 31 so that the MTJ element designated among the MTJ elements of the cell array by the address line (A) is selected as a target for reading a random number value or a target for random number generation. The sense amplifier 51 reads a random number value written in the MTJ element selected by the address line (A). Upon receiving the read signal (~OE), the tri-state buffer 53 sends to the data line (D) the random number value sent from the sense amplifier 51. Upon receiving the read signal (~OE), the register 54 stores the random number value sent from the sense amplifier 51. Each of the register 54 and the tri-state buffer 53 include the second reception unit of the present invention which is configured to receive the read signal (~OE). The tri-state buffer 53 includes the output unit that outputs the random number value (logical value) read by the sense amplifier 51. Upon receiving the random number generation signal (~W), the write driver 52 causes the random number generating pulse for stochastically reversing the present random number value of the MTJ element, which is stored in the register 54, to flow through the MTJ element selected by the address line (A), thereby randomly changing the state of the MTJ element and generating a new random number. The write driver 52 includes the first reception unit of the present invention which is configured to receive the random number generation signal (~W).

Figure 19:
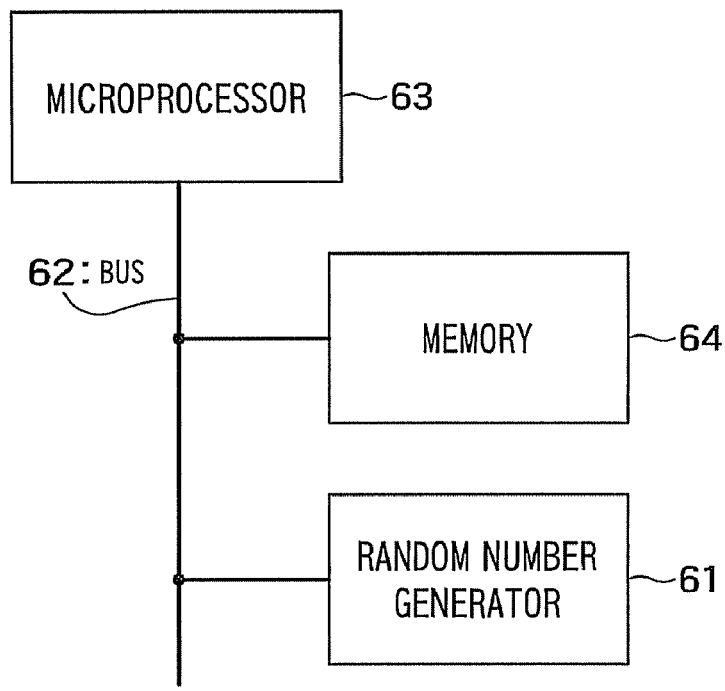
FIG. 19 is a diagram showing a system in which a random number generator, a microprocessor (external circuit), and a memory are connected to each other via a bus.
Figure 20:
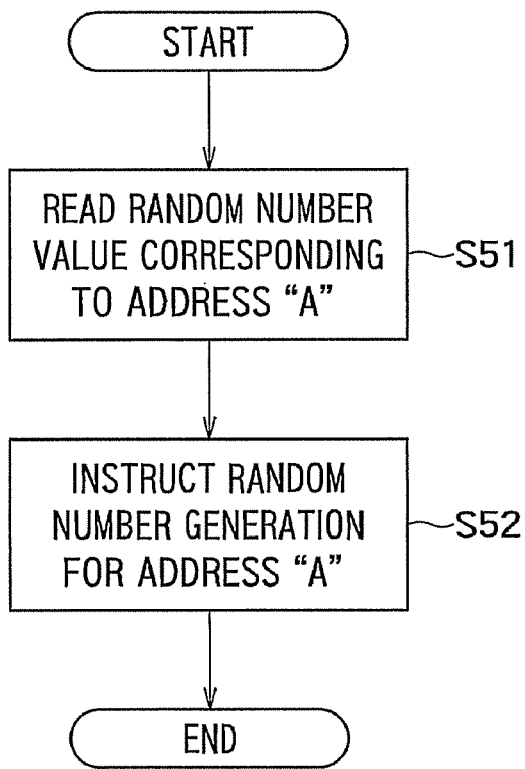
FIG. 20 is a flowchart showing operation performed by an external circuit upon generating a random number using the random number generator shown in FIG. 16.

Upon generating a new random number, the random number generator shown in FIG. 16 reads the present random number value prior to the random number generation, unlike the random number generator shown in FIG. 13. Specifically, upon receiving an instruction for random number generation through the random number generation signal, the random number generator shown in FIG. 13 reads the present value of the designated MTJ element from the register and then generates a new random number for the MTJ element. On the other hand, in the random number generator shown in FIG. 16, the random number value is stored in the register upon reading the value. Accordingly, to generate a new random number, the random number generator first designates an address of an MTJ element for which a random number is to be generated, and reads the value. After that, the random number generator designates the address of the same MTJ element and instructs random number generation. As shown in FIG. 19, for example, when a random number generator 61 (the random number generator shown in FIG. 16 is herein used) is connected to each of a microprocessor 63 and a memory 64 through a bus 62, the microprocessor 63, which intends to cause the random number generator 61 to generate a new random number, instructs the random number generator 61 to generate a random number in the process shown in FIG. 20. Specifically, the microprocessor 63 first designates an address and instructs the random number generator 61 to read the value (S51), and then designates the same address and instructs the random number generator 61 to perform random number generation (S52).

Figure 17:
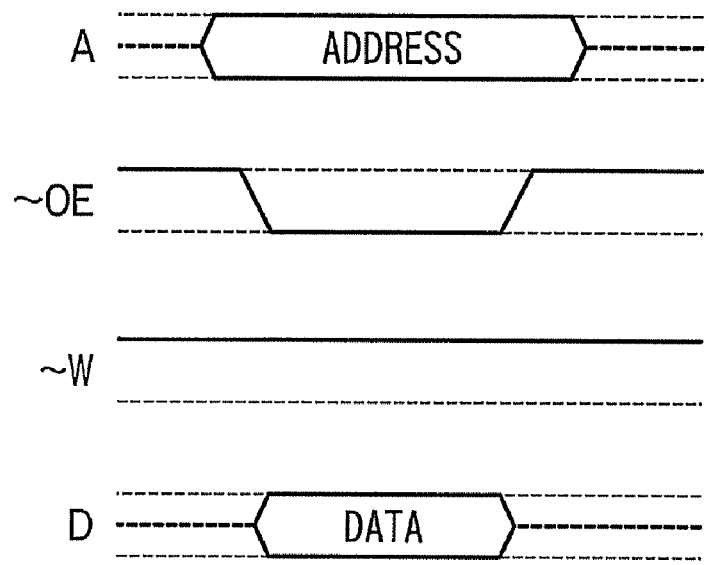
FIG. 17 is a timing diagram of signal lines at the time of reading a random number value from the random number generator shown in FIG. 16.

FIG. 17 is a timing diagram of signal lines at the time of reading a random number value from the random number generator shown in FIG. 16. When the external circuit (for example, a microprocessor) connected to the random number generator reads data from the random number generator, the external circuit first fixes the random number generation signal (~W) to "1", assigns an address of an MTJ element to be read to the address line (A), and changes the read signal (~OE) from "1" to "0", thereby instructing the random number generator to read data. As a result, the address decoder 32 causes the read current to flow through the MTJ element designated by the address line (A) in the cell array 31 of the random number generator, and the sense amplifier 51 converts the current into the logical signal of 0/1 and outputs the data read to the data line (D) through the tri-state buffer 53 which is set to propagate the signal at the read signal (~OE). The value thus obtained is stored into the register 54. After that, when the read signal (~OE) is restored from "0" to "1", the tri-state buffer 53 interrupts propagation of the signal and the output thereof comes into the high-impedance state, so that the output of the data to the data line (D) is also interrupted.

Figure 18:
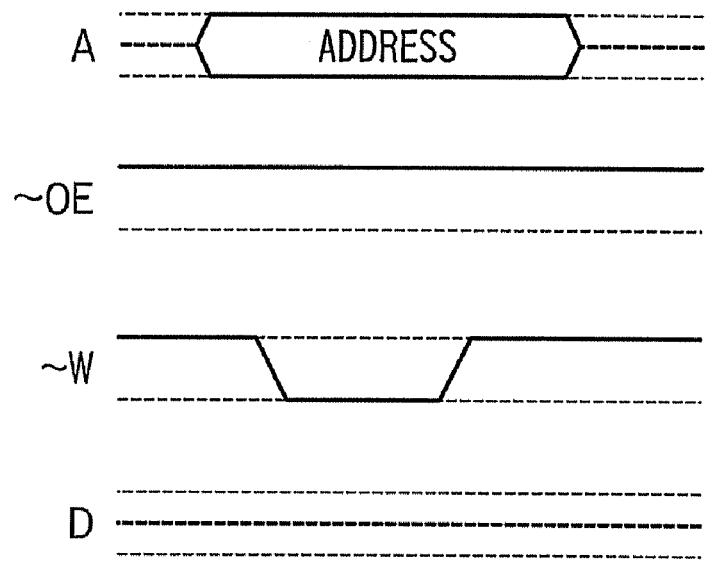
FIG. 18 is a timing diagram of signal lines at the time of causing the random number generator shown in FIG. 16 to generate a new random number.

FIG. 18 is a timing diagram of signal lines when the random number generator shown in FIG. 16 generates a new random number. Assume herein that data is read in advance by designating an address of an MTJ element, for which a random number is to be generated, in the operation shown in FIG. 17 immediately prior to the operation shown in FIG. 18. When the external circuit, such as a microprocessor, which is connected to the random number generator instructs the random number generator to perform random number generation, the external circuit first fixes the read signal (~OE) to "1", assigns an address of an MTJ element, for which a random number is to be generated, to the address line (A), and changes the random number generation signal (~W) from "1" to "0", thereby instructing the random number generator to perform random number generation. As a result, the write driver 52 causes the MTJ element, which is designated by the address line (A) in the cell array 31 of the random number generator, to generate a random number based on the value of the register 54. The write driver 52 causes the MTJ element to generate a random number in the following manner. That is, a pulse of random number generating current in the direction of stochastically reversing the MTJ element from the low resistance state (corresponding to the logical value "0") to the high resistance state (corresponding to the logical value "1") is caused to flow through the MTJ element when the present random number value stored in the register 54 is "0". Meanwhile, a pulse of random number generating current in the direction of reversing of the MTJ element from the high resistance state (corresponding to the logical value "1") to the low resistance state (corresponding to the logical value "0") is caused to flow through the MTJ element when the present random number value stored in the register 54 is "1". The random number generation signal (~W) is restored from "0" to "1", thereby terminating the random number generation processing.

In the random number generator shown in FIG. 16, the process that can be replaced by the reading processing is removed from the random number generation process for the random number generator shown in FIG. 13, and generation of a new random number is implemented by a combination of the reading process and the random number generation process. This mode eliminates the need to perform the reading processing in the random number generation process, leading to shortening of the time required for the random number generation processing. Furthermore, the random number generator can be achieved with a circuit similar to that for writing of the MRAM, thereby simplifying the circuit configuration.

Figure 21:
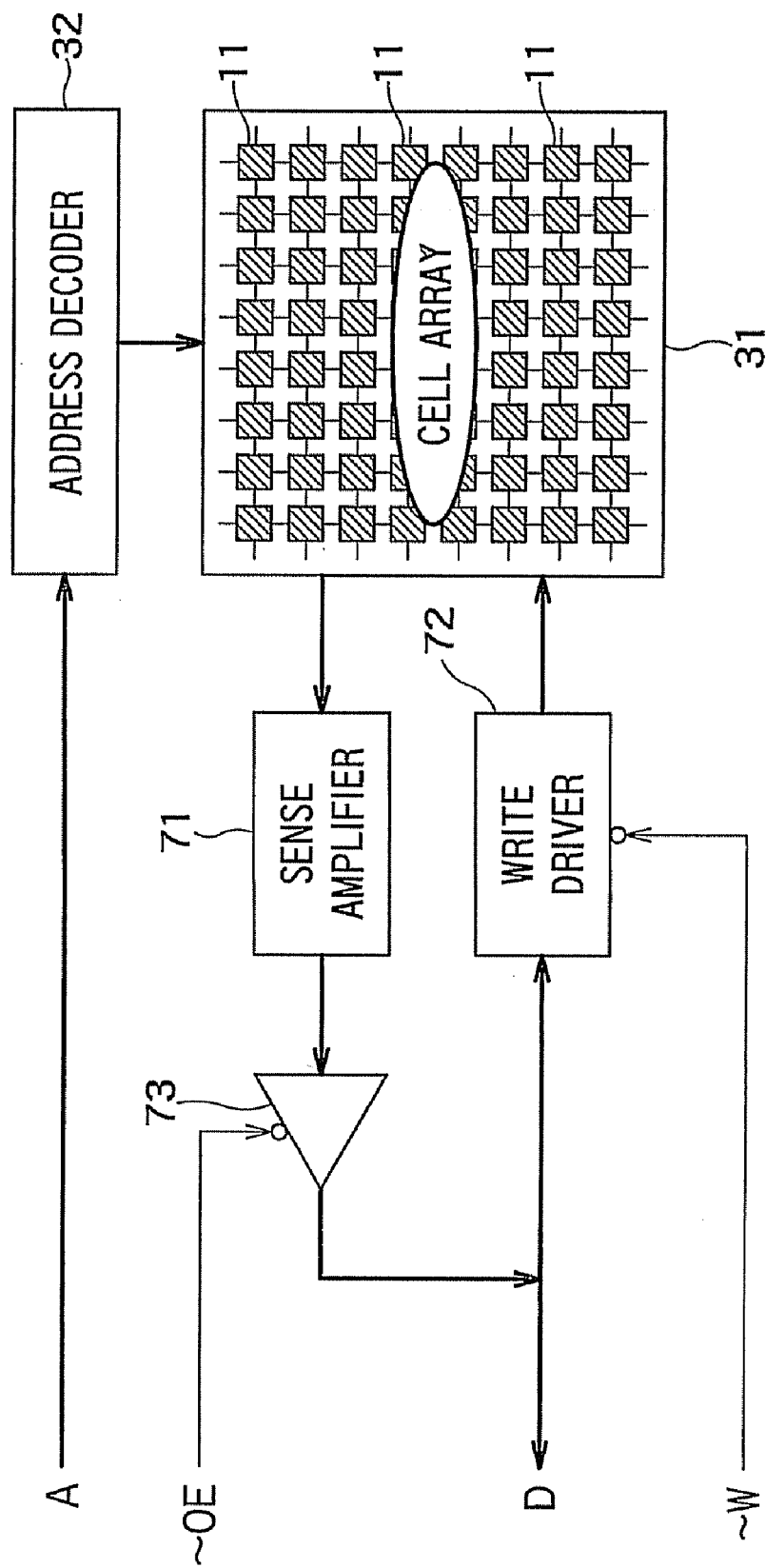
FIG. 21 is a diagram showing a random number generator according to a fifth embodiment.

FIG. 21 shows still another embodiment (fifth embodiment) of the random number generator.

The random number generator shown in FIG. 21 is connected to the external circuit with four types of signal lines: an address line (indicated by "A" in FIG. 21) for designating an address of an MTJ element for random number generation; a data line (indicated by "D" in FIG. 21) for transferring the read random number value and data necessary for the random number generation; a read signal line (indicated by "~OE" in FIG. 21) for instructing to read the state of the MTJ element designated by the address line (A) and to output the read state to the data line (D); and a random number generation signal line (indicated by "~W" in FIG. 21) for instructing the MTJ element designated by the address line (A) to generate a new random number value based on the data (data indicating a random number generating method) assigned to the data line (D). The address line (A) is a multi-bit signal line corresponding to the number of MTJ elements so as to select the plurality of MTJ elements in the random number generator. The data line (D) is also a single signal line when the random number generator capable of simultaneously reading or generating one-bit random number values is used, but may be a multi-bit signal line when the random number generator capable of simultaneously reading or generating multi-bit random number values is used. When the data line (D) is a multi-bit signal line, the data line handles multi-bit signals in parallel by use of a plurality of sense amplifiers and write drivers.

The random number generator includes the cell array 31, the address decoder 32, a sense amplifier 71, a write driver 72, and a tri-state buffer 73. The cell array 31 has an array structure in which the plurality of MTJ elements 11 for random number generation are disposed at intersections between a plurality of word lines and a plurality of bit lines. The address decoder 32 is connected to the address line (A) and controls the word lines, as well as the bit lines as needed, of the cell array 31 so that the MTJ element designated among the MTJ elements of the cell array by the address line (A) is selected as a target for reading a random number value or a target for random number generation. The sense amplifier 71 reads a random number value written in the MTJ element selected by the address line (A). Upon receiving the read signal (~OE), the tri-state buffer 73 sends to the data line (D) the random number value sent from the sense amplifier 71. Upon receiving the random number generation signal (~W), the write driver 72 causes the random number generating pulse for stochastically reversing the state to flow through the MTJ element selected by the address line (A) based on the data indicating the random number generating method designated by the data line (D), thereby randomly changing the state of the MTJ element and generating a new random number. The write driver 72 includes the first reception unit of the present invention which is configured to receive the random number generation signal, and a fifth reception unit of the present invention which is configured to receive the random number generating method data. The tri-state buffer 73 includes the second reception unit of the present invention which is configured to receive the read signal.

The random number generator shown in FIG. 21 is used in combination with the external circuit, such as the microprocessor 63, as shown in FIG. 19. The external circuit, such as the microprocessor 63, which intends to cause the random number generator shown in FIG. 21 to generate a new random number, instructs the random number generator to generate a random number in the process shown in FIG. 24. Specifically, the external circuit designates an address and instructs the random number generator to read the value, thereby acquiring a random number value "R" (S61). Then, the external circuit produces data "~R" indicating the random number generating method by taking a negation of each bit of the acquired random number value "R" (S62). Lastly, the external circuit designates the same address and designates the data "~R" indicating the random number generating method, thereby instructing the random number generator to perform random number generation (S63). That is, the register included in the random number generator shown in FIG. 16 is omitted. Instead, the read random number value is stored in the external circuit, such as the microprocessor 63, and the stored value is delivered to the random number generator upon giving an instruction to perform random number generation. The processor 63 instructs reading of the random number value from the random number generator shown in FIG. 21 by reading data from the random number generator connected through the bus 62. The processor 63 instructs the random number generator shown in FIG. 21 to perform random number generation by writing data indicating the random number generating method into the random number generator connected through the bus 62.

Figure 24:
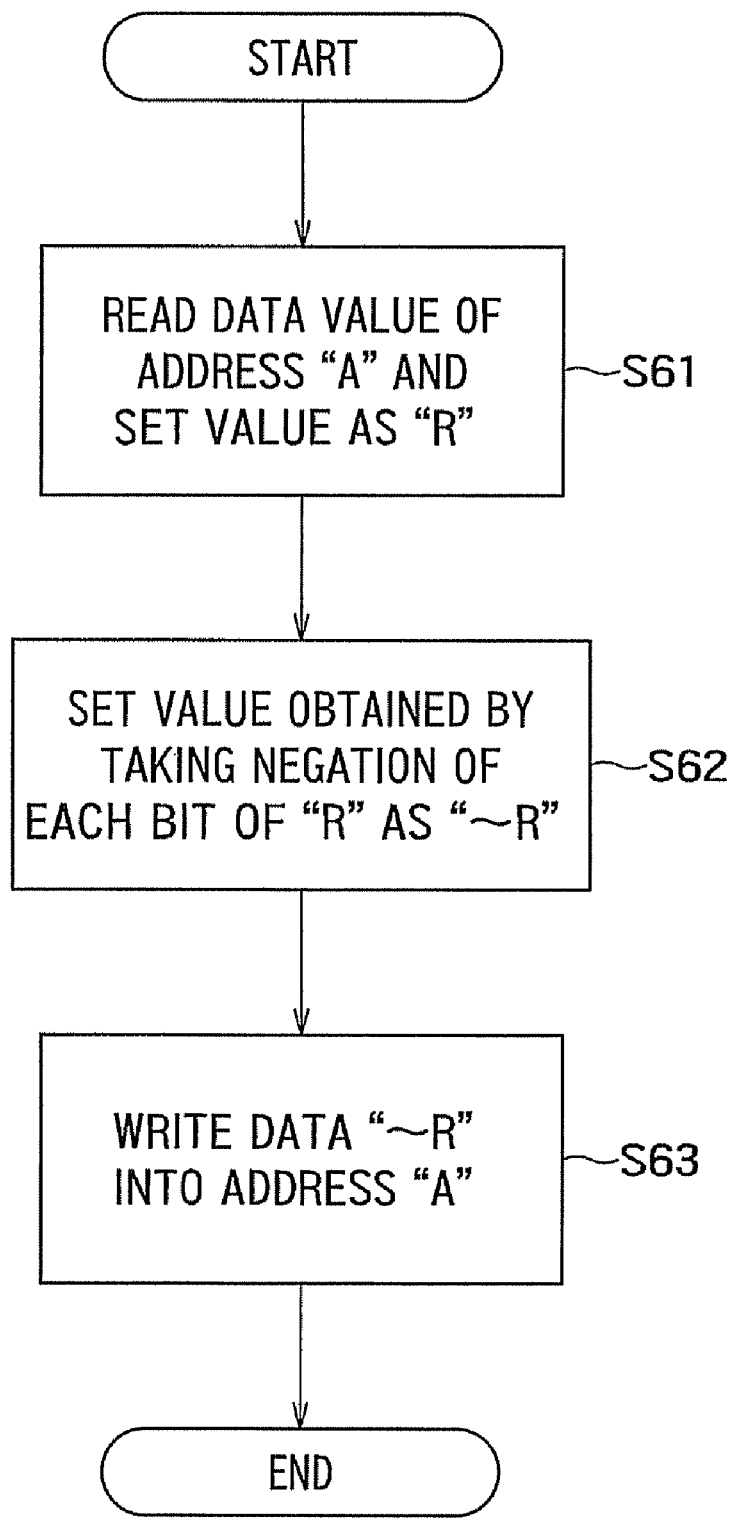
FIG. 24 is a flowchart showing operation performed by an external circuit upon generating a random number using the random number generator shown in FIG. 21 or a random number generator shown in FIG. 25.

Note that in the process shown in FIG. 24, the microprocessor 63 generates the random number generating method data by taking a negation of the present random number value read from the random number generator, and assigns the generated data to the data line (D) upon random number generation. This is because the instruction for the random number generator to perform random number generation is made such that a pulse of random number generating current for stochastically reversing the state from the high resistance state (logical value "1") to the low resistance state (logical value "0") is caused to flow when the logical value "0" is assigned to the data line (D) as the random number generating method data, and a pulse of random number generating current for stochastically reversing the state from the low resistance state (logical value "0") to the high resistance state (logical value "1") is caused to flow when the logical value "1" is assigned to the data line (D) as the random number generating method data. In the case where the interpretation of the data to be assigned to the data line (D) is reversed, when the logical value "1" is assigned to the data line (D) as the random number generating method data, a pulse of random number generating current for stochastically reversing the state from the high resistance state (logical value "1") to the low resistance state (logical value "0") is caused to flow. Meanwhile, when the logical value "0" is assigned to the data line (D) as the random number generating method data, a pulse of random number generating current for stochastically reversing the state from the low resistance state (logical value "0") to the high resistance state (logical value "1") is caused to flow. This eliminates the need to carry out step S62 for taking a negation of the value of the read data in FIG. 24. Accordingly, the read random number value "R" may be directly designated as the random number generating method data.

Figure 22:
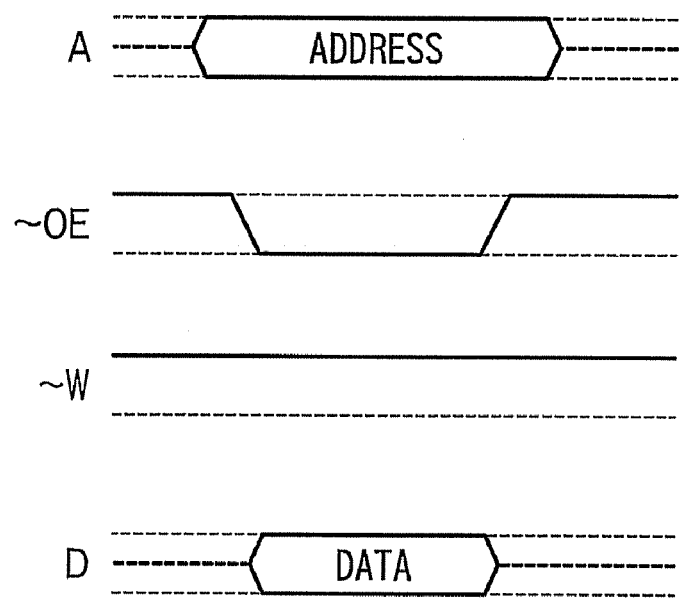
FIG. 22 is a timing diagram of signal lines at the time of reading a random number value from the random number generator shown in FIG. 21.

FIG. 22 is a timing diagram of signal lines at the time of reading a random number value from the random number generator shown in FIG. 21. When the external circuit (for example, a microprocessor) connected to the random number generator reads data from the random number generator, the external circuit first fixes the random number generation signal (~W) to "1", assigns an address of an MTJ element to be read to the address line (A), and changes the read signal (~OE) from "1" to "0", thereby instructing the random number generator to read data. As a result, a read current is caused to flow through the MTJ element designated by the address line (A) in the cell array 31 of the random number generator, and the sense amplifier 71 converts the current into the logical signal of 0/1 and outputs the data read to the data line (D) through the tri-state buffer 73 which is set to propagate the signal at the read signal (~OE). After that, when the read signal (~OE) is restored from "0" to "1", the tri-state buffer 73 interrupts propagation of the signal and the output thereof comes into the high-impedance state, so that the output of the data to the data line (D) is also interrupted.

Figure 23:
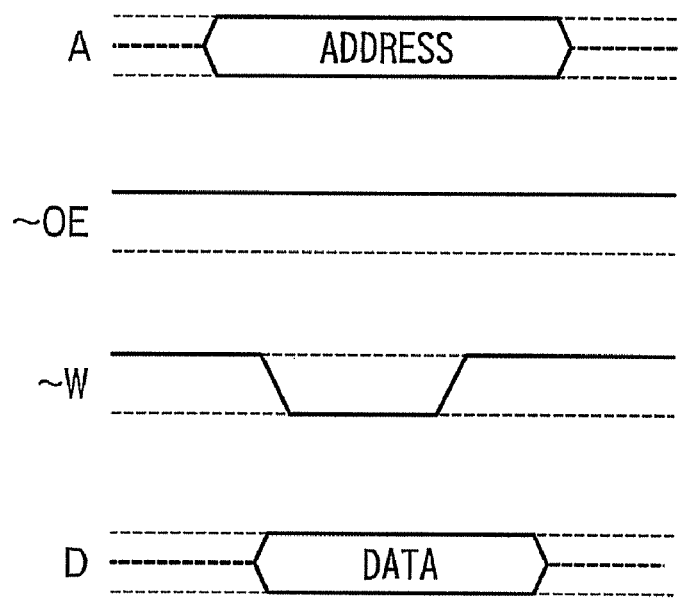
FIG. 23 is a timing diagram of signal lines at the time of causing the random number generator shown in FIG. 21 to generate a new random number.

FIG. 23 is a timing diagram of signal lines when the random number generator shown in FIG. 21 generates a new random number. Assume herein that data is read in advance by designating an address of an MTJ element, for which a random number is to be generated, in the operation shown in FIG. 21 immediately prior to the operation shown in FIG. 23. When the external circuit, such as a microprocessor, which is connected to the random number generator instructs the random number generator to perform random number generation, the external circuit first fixes the read signal (~OE) to "1". Then, the external circuit assigns an address of an MTJ element, for which a random number is to be generated, to the address line (A), assigns the random number generating method data, which indicates a value obtained by taking a negation of each bit of the present random number value previously read, to the data line (D), and changes the random number generation signal (~W) from "1" to "0", thereby instructing the random number generation. As a result, the write driver 72 causes the MTJ element designated by the address line (A) in the cell array 31 of the random number generator to generate a random number based on the value assigned to the data line (D). The write driver 72 causes the MTJ element to generate a random number in the following manner. That is, a pulse of random number generating current in the direction of stochastically reversing the MTJ element from the high resistance state (corresponding to the logical value "1") to the low resistance state (corresponding to the logical value "0") is caused to flow through the MTJ element when the value assigned to the data line (D) is "0". Meanwhile, a pulse of random number generating current in the direction of reversing the MTJ element from the low resistance state (corresponding to the logical value "0") to the high resistance state (corresponding to the logical value "1") to flow through the MTJ element when the value assigned to the data line (D) is "1". The random number generation signal (~W) is restored from "0" to "1", thereby terminating the random number generation processing.

The random number generator shown in FIG. 21 has a configuration in which the register is omitted from the random number generator shown in FIG. 16, thereby simplifying the circuit configuration. This mode can be achieved only by using a circuit equivalent to an MRAM and replacing the current value of the write pulse for the MRAM with a current value of a random number generating pulse for stochastically reversing the MTJ element.

Figure 25:
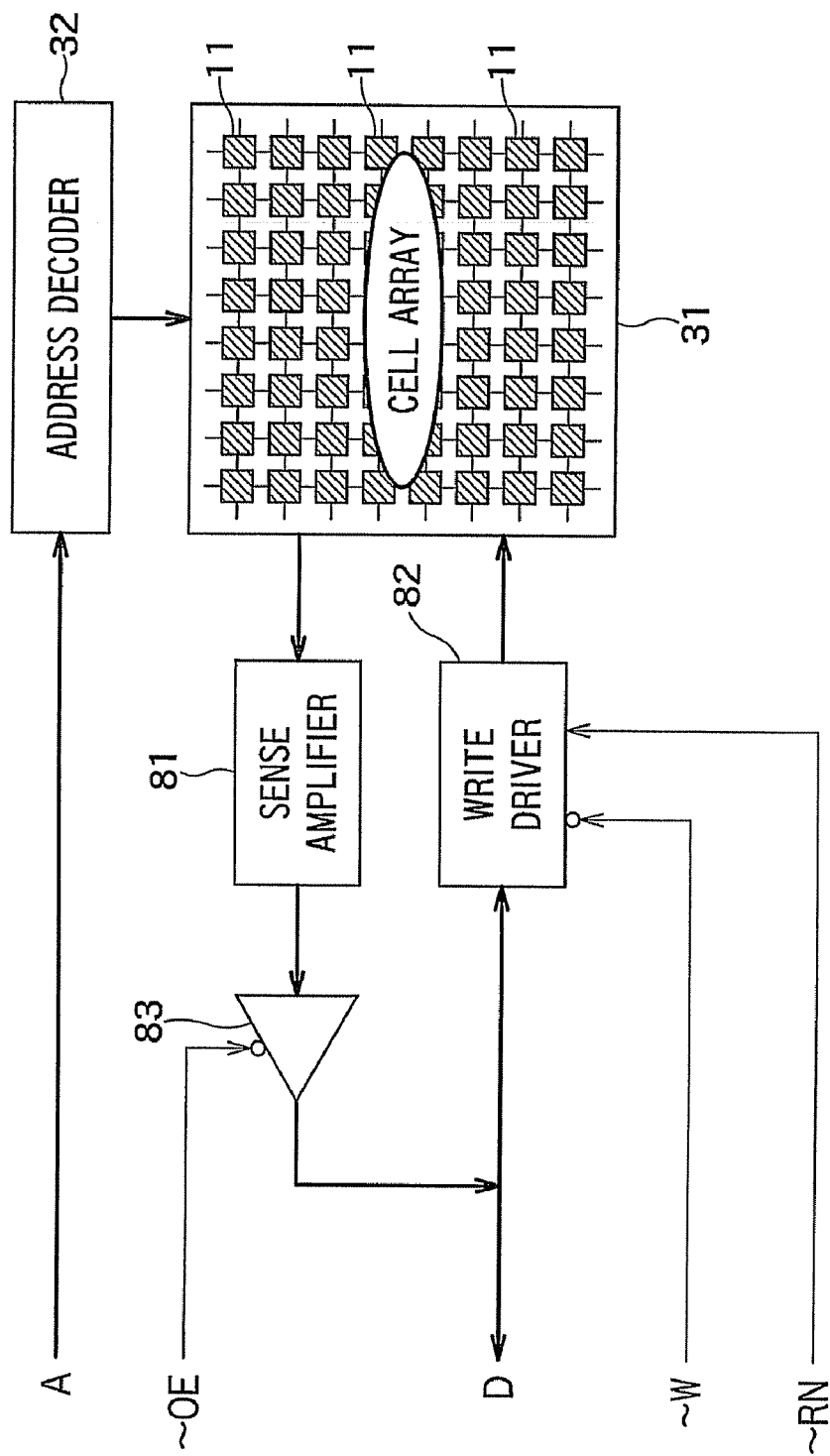
FIG. 25 is a diagram showing a random number generator according to a sixth embodiment.

FIG. 25 shows another embodiment (sixth embodiment) which is obtained by modifying the random number generator shown in FIG. 21 and in which each MTJ element can be used for random number generation and also for a memory element of a typical MRAM.

The random number generation signal (~W) of the random number generator shown in FIG. 21 serves as the write signal (~W) in a random number generator shown in FIG. 25. In the random number generator shown in FIG. 25, the write signal (~W) is used for instructing to write data as a memory and for instructing to perform random number generation. In the random number generator shown in FIG. 25, a random number mode signal (~RN) is added to the random number generator shown in FIG. 21. The random number mode signal (~RN) is applied to a write driver 82. When the write signal (~W) changes from "1" to "0", the write driver 82 performs write processing into a typical memory if the random number mode signal (~RN) indicates "1". In other words, the write driver 82 causes a write pulse to flow through the MTJ element selected by the address line (A) based on the data (write data) assigned to the data line (D), thereby changing the state of the MTJ element and storing the assigned data. Specifically, when the assigned data indicates "0", a write pulse (third current) in the direction of reversing the MTJ element from the high resistance state (corresponding to the logical value "1") to the low resistance state (corresponding to the logical value "0") is caused to flow. Meanwhile, when the assigned data indicates "1", a write pulse (fourth current) in the direction of reliably reversing the MTJ element from the low resistance state (corresponding to the logical value "0") to the high resistance state (corresponding to the logical value "1") is caused to flow. On the other hand, when the write signal (~W) changes from "1" to "0" and when the random number mode signal (~RN) indicates "0", the write driver 82 carries out random number generation processing. Specifically, the write driver 82 causes the random number generating pulse for stochastically reversing the state of the MTJ element to flow through the MTJ element selected by the address line (A) based on the data (random number generating method data) assigned to the data line (D), thereby randomly changing the state of the MTJ element and generating a new random number. The write driver 82 includes a fourth reception unit of the present invention which is configured to receive the write data.

The random number generator shown in FIG. 25 is used in combination with the external circuit, such as the microprocessor 63, as shown in FIG. 19. The external circuit, such as the microprocessor 63, which intends to generate a new random number using the random number generator shown in FIG. 25, instructs the random number generation in the process shown in FIG. 24. Specifically, the external circuit first designates an address and instructs the random number generator to read the value (S61). Then, the external circuit acquires data which is a value obtained by taking a negation of each bit of the read random number value (S62), and designates the same address and sends the instruction for the random number generation and the data to the random number generator (S63).

Figure 26:
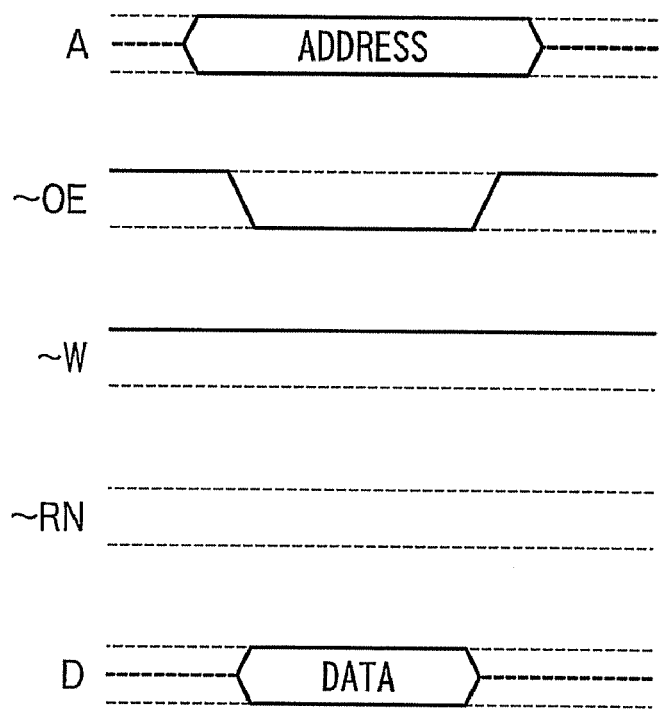
FIG. 26 is a timing diagram of signal lines at the time of reading a random number value or a value stored in a memory from the random number generator shown in FIG. 25.

FIG. 26 is a timing diagram of signal lines at the time of reading a random number value or a value stored in a memory from the random number generator shown in FIG. 25. When the external circuit (for example, a microprocessor) connected to the random number generator reads data from the random number generator, the external circuit first fixes the write signal (~W) to "1", assigns an address of an MTJ element to be read to the address line (A), and changes the read signal (~OE) from "1" to "0", thereby instructing the random number generator to read data. As a result, a read current is caused to flow through the MTJ element designated by the address line (A) in the cell array 31 of the random number generator, and a sense amplifier 81 converts the current into the logical signal of 0/1 and outputs the data read to the data line (D) through a tri-state buffer 83 which is set to propagate the signal at the read signal (~OE). After that, when the read signal (~OE) is restored from "0" to "1", the tri-state buffer 83 interrupts propagation of the signal and the output thereof comes into the high-impedance state, so that the output of the data to the data line (D) is also interrupted.

Figure 27:
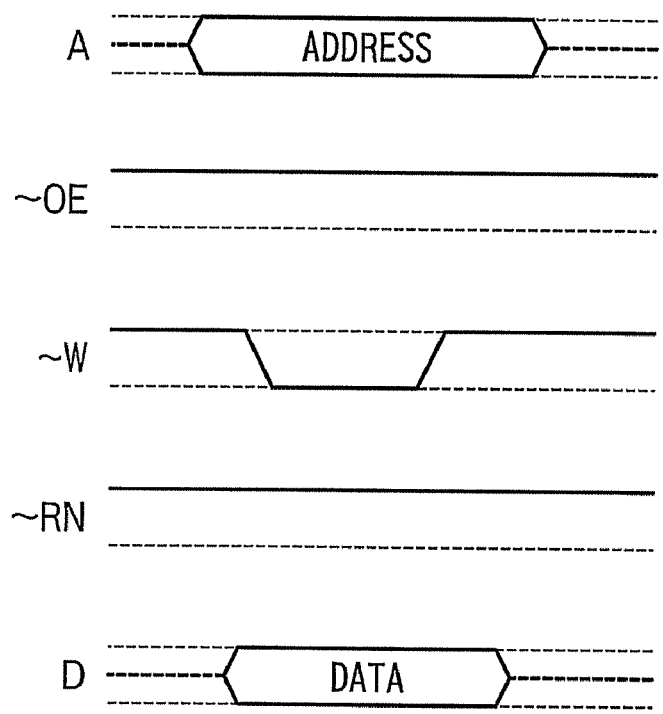
FIG. 27 is a timing diagram of signal lines at the time of writing data using the random number generator shown in FIG. 25 as an MRAM.

FIG. 27 is a timing diagram of signal lines at the time of writing data using the random number generator shown in FIG. 25 as an MRAM. The external circuit, such as a microprocessor, which is connected to the random number generator instructs data writing, the external circuit first fixes the read signal (~OE) to "1" and the random mode signal (~RN) to "1". Then, the external circuit assigns an address of an MTJ element to be written to the address line (A), assigns a value of data to be written to the data line (D), and changes the write signal (~W) from "1" to "0", thereby instructing the random number generator to write data. As a result, the value assigned to the data line (D) is stored in the MTJ element designated by the address line (A) in the cell array 31 of the random number generator. The write driver 82 writes the data into the MTJ element in the following manner. That is, a pulse of write current in the direction of reliably reversing the MTJ element from the high resistance state (corresponding to the logical value "1") to the low resistance state (corresponding to the logical value "0") to flow through the MTJ element when the value assigned to the data line (D) is "0". Meanwhile, a pulse of write current in the direction of reliably reversing the MTJ element from the low resistance state (corresponding to the logical value "0") to the high resistance state (corresponding to the logical value "1") to flow through the MTJ element when the value assigned to the data line (D) is "1". The write signal (~W) is restored from "0" to "1", thereby terminating the write processing.

Figure 28:
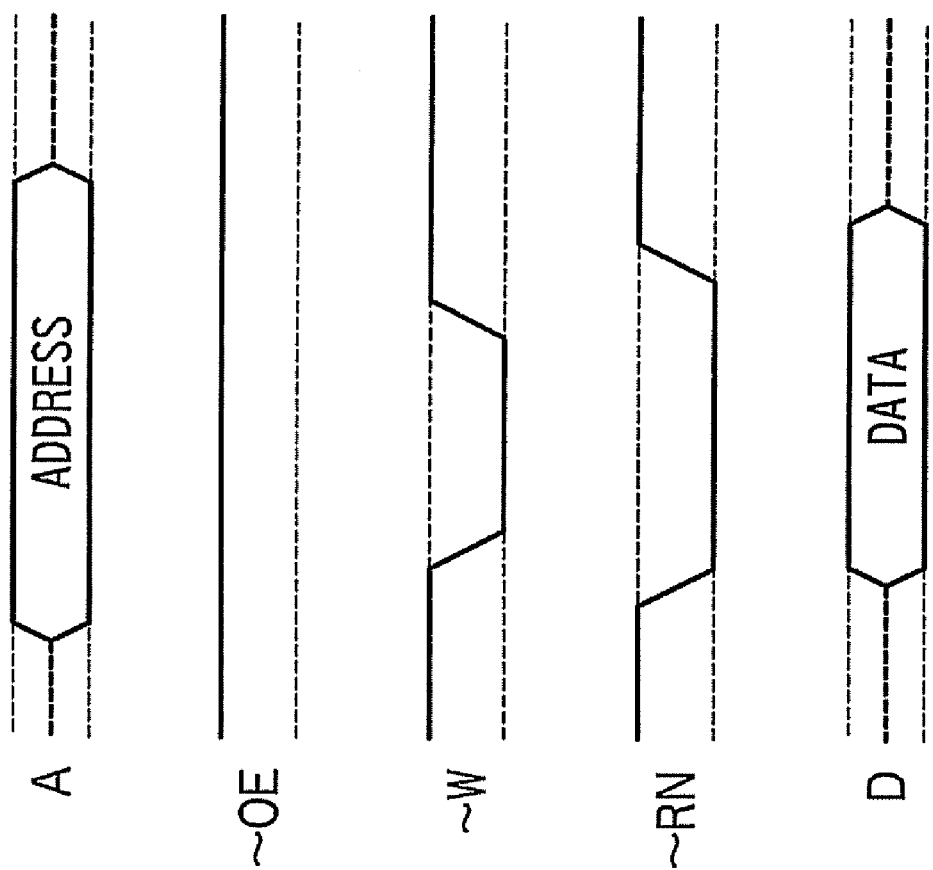
FIG. 28 is a timing diagram of signal lines at the time of causing the random number generator shown in FIG. 25 to generate a new random number.

FIG. 28 is a timing diagram of signal lines at the time of causing the random number generator shown in FIG. 25 to generate a new random number. Assume herein that the present value is read in advance by designating an address of an MTJ element, for which a random number is to be generated, in the operation shown in FIG. 26 prior to the operation shown in FIG. 28. When the external circuit, such as a microprocessor, which is connected to the random number generator instructs the random number generator to perform random number generation, the external circuit first fixes the read signal (~OE) to "1". Then, the external circuit assigns an address of an MTJ element, for which a random number is to be generated, to the address line (A), assigns the random number generating method data, which is a value obtained by taking a negation of each bit of the present random number value previously read, to the data line (D), and changes the random number mode signal (~RN) from "1" to "0". After that, the external circuit changes the write signal (~W) from "1" to "0", thereby instructing the random number generator to perform random number generation. As a result, the write driver 82 causes the MTJ element designated by the address line (A) in the cell array 31 of the random number generator to generate a random number based on the value assigned to the data line (D). The write driver 82 causes the MTJ element to perform random number generation in the following manner. That is, a pulse of random number generating current in the direction of stochastically reversing the MTJ element from the high resistance state (corresponding to the logical value "1") to the low resistance state (corresponding to the logical value "0") is caused to flow through the MTJ element when the value assigned to the data line (D) is "0". Meanwhile, a pulse of random number generating current in the direction of reversing the MTJ element from the low resistance state (corresponding to the logical value "0") to the high resistance state (corresponding to the logical value "1") is caused to flow through the MTJ element when the value assigned to the data line (D) is "1". Each of the write signal (~W) and the random number mode signal (~RN) is restored from "0" to "1", thereby terminating the write processing.

The random number generator shown in FIG. 25 can be implemented only by using a circuit equivalent to an MRAM and replacing the current value of the write pulse for the MRAM with the current value of the random number generating pulse for stochastically reversing the MTJ element according to the value of the random number mode signal (~RN).

When the random number generator shown in FIG. 25 is connected to the microprocessor 63 as shown in FIG. 19, buses of a typical processor include signal lines for reading and writing data, but may include no signal line suitable for applying the random number mode signal. In such a case, the random number generator may be mapped to two areas in the memory space of the processor. In the case of writing data into one of the areas, a typical wiring process may be performed as the MRAM, and in the case of writing data into the other area, random number generation may be performed. That is, the random number mode signal (~RN) may be assumed as an address line having a higher order than the address line (A) for designating the MTJ element in the random number generator.

Note that the use of the random number generator shown in FIG. 25 also makes it possible to implement the random number generating method of the related art in which a pulse of random number generating current for stochastically reversing the state from the low resistance state (logical value "0") to the high resistance state (logical value "1") is caused to flow through the MTJ element reset to the low resistance state (logical value "0") to generate a random number. In this case, the external circuit, such as a microprocessor, which is connected to the random number generator assigns an address of an MTJ element for random number generation to the random number generator, and first writes the data having the logical value "0" into all the bits by a typical MRAM wiring method. Next, the external circuit assigns the random number generating method data, all the bits of which have the logical value "1", to the same address, and instructs random number generation, thereby making it possible to generate a random number.

Like the random number generator shown in FIG. 25, the random number generators shown in FIGS. 13 and 16 can also be implemented by modifying the MTJ element to be used for random number generation as a memory element of a typical MRAM.

Figure 29:
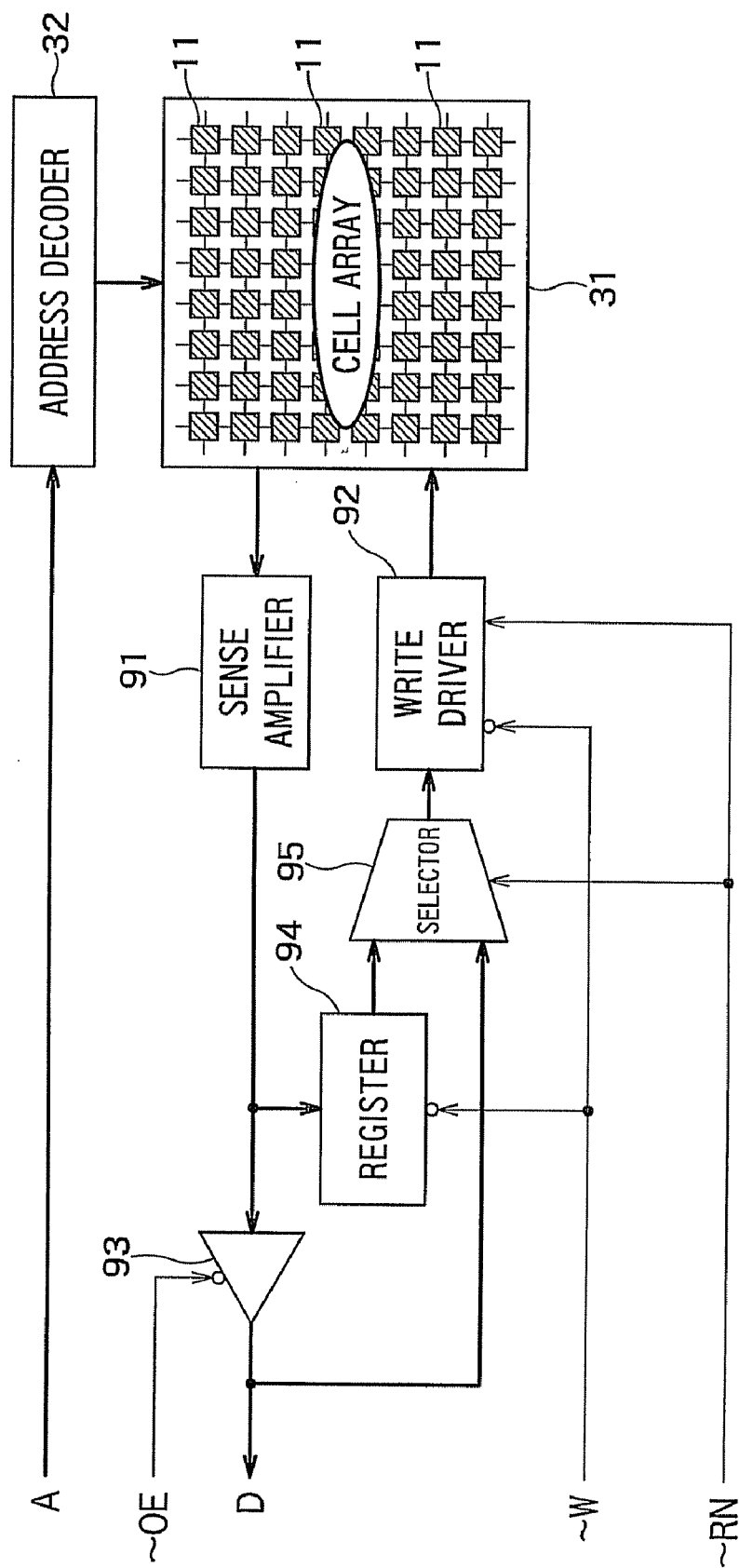
FIG. 29 is a diagram showing a random number generator according to a seventh embodiment.

FIG. 29 shows another embodiment (seventh embodiment) which is obtained by modifying the random number generator shown in FIG. 13 to be also used as an MRAM. Like in the random number generator shown in FIG. 25, the random number generation signal (~W) in the random number generator shown in FIG. 13 serves as the write signal (~W) in a random number generator shown in FIG. 29 and is used for instructing to write data as a memory and for instructing to perform random number generation. The random number generator shown in FIG. 29 has a configuration in which the random number mode signal (~RN) and a selector 95 are added to the circuit configuration of the random number generator shown in FIG. 13. The random number mode signal (~RN) is applied to the selector 95. The selector 95 transfers an output of a register 94 to a write driver 92 when the random number mode signal (~RN) indicates "0", and transfers the data of the data line (D) to the write driver 92 when the random number mode signal (~RN) indicates "1". The random number mode signal (~RN) is also applied to the write driver 92. When the write signal (~W) changes from "1" to "0" and when the random number mode signal (~RN) indicates "1", the write driver 92 performs write processing into a typical memory. In other words, the write driver 92 causes a write pulse to flow through the MTJ element selected by the address line (A) based on the data which is assigned to the data line (D) and sent from the selector 95, thereby changing the state of the MTJ element and storing the data assigned to the data line (D). Specifically, when the assigned data indicates "0", the write driver 92 causes a write pulse (third current) for reliably reversing the state of the MTJ element from the high resistance state (corresponding to the logical value "1") to the low resistance state (corresponding to the logical value "0") to flow through the MTJ element. Meanwhile, when the assigned data indicates "1", the write driver 92 causes a write pulse (fourth current) for reliably reversing the MTJ element from the low resistance state (corresponding to the logical value "0") to the high resistance state (corresponding to the logical value "1") to flow through the MTJ element. On the other hand, when the write signal (~W) changes from "1" to "0" and when the random number mode signal (~RN) indicates "0", the write driver 92 carries out random number generation processing. Specifically, the write driver 92 causes the random number generating pulse for stochastically reversing the MTJ element, which is selected by the address line (A), to flow through the MTJ element based on the output of the register 94, which is sent from the selector 95, thereby randomly changing the state of the MTJ element and generating a new random number. Note that the tri-state buffer 93 shown in FIG. 29 has the same function as that of the tri-state buffer 43 shown in FIG. 13.

The state where the random number mode signal (~RN) indicates "0" and the write signal (~W) indicates "0" corresponds to the state where the random number generation signal of the present invention has been received. The state where the random number mode signal (~RN) indicates "1" and the write signal (~W) indicates "0" corresponds to the state where the write signal of the present invention has been received. The write driver 92 includes the first reception unit of the present invention which is configured to receive the random number generation signal (herein indicates the state where the random number mode signal (~RN) indicates "0" and the write signal (~W) indicates "0"), and a third reception unit of the present invention which is configured to receive the write signal (herein indicates the state where the random number mode signal (~RN) indicates "1" and the write signal (~W) indicates "0"). The selector 95 includes the fourth reception unit of the present invention which is configured to receive the write data (data of the data line (D)).

Referring to FIG. 29, the register 94 is configured to store the read data sent from a sense amplifier 91 when the write signal (~W) changes from "1" to "0". The stored data is required only during the random number generation. Accordingly, when the random number mode signal (~RN) indicates "0", the read data sent from the sense amplifier 91 may be stored at the point when the write signal (~W) changes from "1" to "0".

Figure 30:
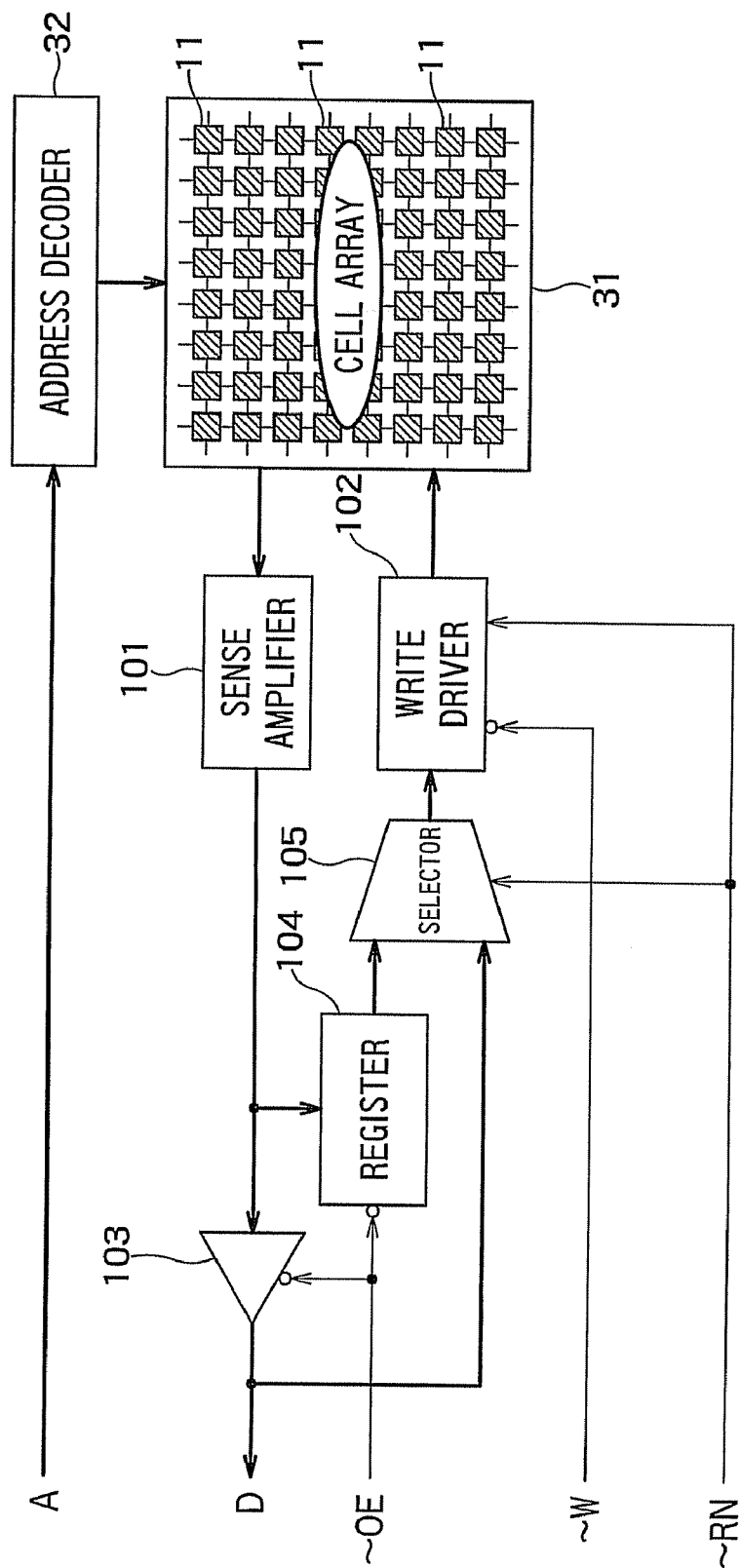
FIG. 30 is a diagram showing a random number generator according to an eighth embodiment.

FIG. 30 shows another embodiment (eighth embodiment) which is obtained by modifying the random number generator shown in FIG. 16 to also be used as an MRAM. Like in the random number generator shown in FIG. 25, the random number generation signal (~W) in the random number generator shown in FIG. 16 serves as the write signal (~W) in a random number generator shown in FIG. 30 and is used for instructing to write data as a memory and for instructing to perform random number generation. The random number generator shown in FIG. 30 has a configuration in which the random number mode signal (~RN) and a selector 105 are added to the circuit configuration of the random number generator shown in FIG. 16. The random number mode signal (~RN) is applied to the selector 105. The selector 105 transfers an output of a register 104 to a write driver 102 when the random number mode signal (~RN) indicates "0", and transfers the data of the data line (D) to the write driver 102 when the random number mode signal (~RN) indicates "1". The random number mode signal (~RN) is also applied to the write driver 102. When the write signal (~W) changes from "1" to "0" and when the random number mode signal (~RN) indicates "1", the write driver 102 carries out write processing into a typical memory. In other words, the write driver 102 causes a write pulse to flow through the MTJ element selected by the address line (A) based on the data which is assigned to the data line (D) and sent from the selector 105, thereby changing the state of the MTJ element and storing the data assigned to the data line (D). Specifically, when the assigned data indicates "0", the write driver 102 causes a write pulse (third current) for reliably reversing the MTJ element from the high resistance state (corresponding to the logical value "1") to the low resistance state (corresponding to the logical value "0") to flow through the MTJ element. Meanwhile, when the assigned data indicates "1", the write driver 102 causes a write pulse (fourth current) for reliably reversing the MTJ element from the low resistance state (corresponding to the logical value "0") to the high resistance state (corresponding to the logical value "1") to flow through the MTJ element. On the other hand, when the write signal (~W) changes from "1" to "0", the write driver 102 carries out random number generation processing if the random number mode signal (~RN) indicates "0". Specifically, the write driver 102 causes the random number generating pulse for stochastically reversing the state of the MTJ element, which is selected by the address line (A), based on the output of the register 104 sent from the selector 105, thereby randomly changing the state of the MTJ element and generating a new random number. Note that a sense amplifier 101 and a tri-state buffer 103 respectively have the same functions as those of the sense amplifier 51 and the tri-state buffer 53 shown in FIG. 16.

The state where the random number mode signal (~RN) indicates "0" and the write signal (~W) indicates "0" corresponds to the state where both the random number generation signal and the write signal of the present invention have been received. The state where the random number mode signal (~RN) indicates "1" and the write signal (~W) indicates "0" corresponds to the state where the write signal of the present invention has been received and the random number generation signal has not been received. The write driver 102 includes the first reception unit which is configured to receive the random number generation signal (herein indicates the state where the random number mode signal (~RN) indicates "0" and the write signal (~W) indicates "0"), and the third reception unit of the present invention which is configured to receive the write signal (herein indicates the state where the random number mode signal (~RN) indicates "1" and the write signal (~W) indicates "0"). The selector 105 includes the fourth reception unit of the present invention which is configured to receive the write data (data of the data line (D)).

Figure 31:
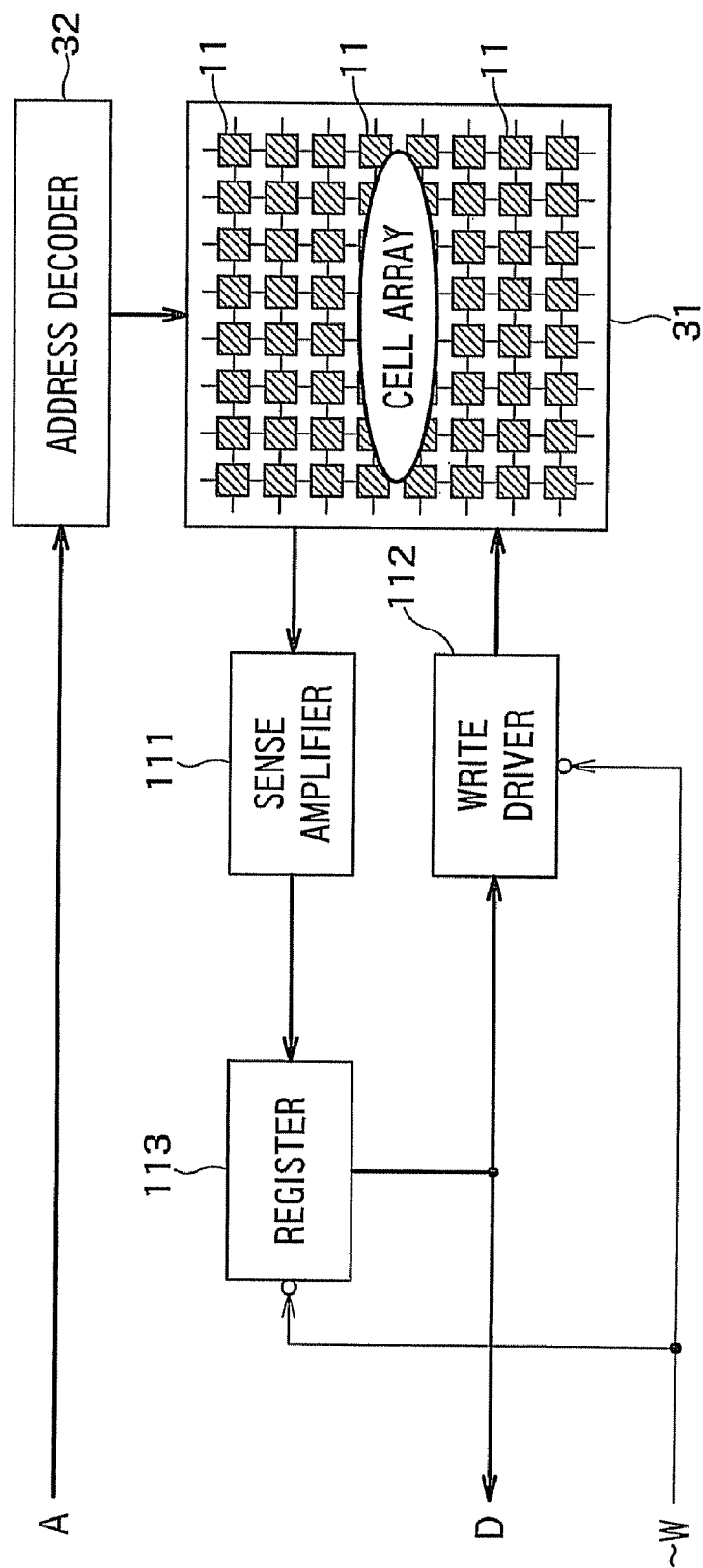
FIG. 31 is a diagram showing the random number generator according to a ninth embodiment.

In the embodiments described above, generation of a random number and reading of a random number are performed at different timings, but may be performed simultaneously. FIG. 31 shows a configuration of a random number generator (ninth embodiment) which is obtained by modifying the random number generator shown in FIG. 13. The random number generator of the ninth embodiment performs generation of a random number and reading of a random number simultaneously.

The random number generator shown in FIG. 31 is connected to the external circuit with three types of signal lines: an address line (indicated by "A" in FIG. 31) for designating an address of an MTJ element for random number generation; a data line (indicated by "D" in FIG. 31) for reading a value of a random number; and a random number generation signal line (indicated by "~W" in FIG. 31) for instructing the MTJ element designated by the address line (A) to read the state of the MTJ element designated by the address line (A) and output the read state to the data line (D) and to generate a new random number value. The address line (A) is a multi-bit signal line corresponding to the number of MTJ elements so as to select the plurality of MTJ elements in the random number generator. The data line (D) is also a single signal line when the random number generator capable of simultaneously reading one-bit random number values is used, but may be a multi-bit signal line when the random number generator capable of simultaneously reading multi-bit random number values is used. When the data line (D) is a multi-bit signal line, the data line handles multi-bit signals in parallel by use of a plurality of sense amplifiers and write drivers.

The random number generator includes the cell array 31, the address decoder 32, a sense amplifier 111, a write driver 112, and a register 113. The cell array 31 has an array structure in which the plurality of MTJ elements for random number generation are disposed at intersections between a plurality of word lines and a plurality of bit lines. The address decoder 32 is connected to the address line (A) and controls the word lines, as well as the bit lines as needed, of the cell array 31 so that the MTJ element designated among the MTJ elements of the cell array 31 by the address line (A) is selected as a target for reading a random number value or a target for random number generation. The sense amplifier 111 reads a random number value written in the MTJ element selected by the address line (A). Upon receiving the random number generation signal (~W), the register 113 stores the random number value sent from the sense amplifier 111. The output of the register 113 is connected to each of the data line (D) and the write driver 112. Upon receiving the random number generation signal (~W), the write driver 112 causes a random number generating pulse for stochastically reversing the present random number value stored in the MTJ element to flow through the MTJ element selected by the address line (A) based on the value sent from the register 113, thereby randomly changing the state of the MTJ element and generating a new random number. Each of the write driver 112 and the register 113 includes the first reception unit of the present invention which is configured to receive the random number generation signal.

FIG. 32 is a timing diagram of signal lines at the time of instructing the random number generator shown in FIG. 31 to generate and read a random number. When the external circuit (for example, a microprocessor) connected to the random number generator instructs the random number generator to generate and read a random number, the external circuit assigns an address of an MTJ element, for which a random number is to be generated and read, to the address line (A), and changes the random number generation signal (—W) from "1" to "0", thereby instructing the random number generator to generate and read a random number. As a result, a read current is caused to flow through the MTJ element designated by the address line (A) in the cell array 31 of the random number generator, and the sense amplifier 111 converts the current into the logical signal of 0/1. The value thus obtained is stored into the register 113. The present value of the MTJ element stored in the register 113 is output to the data line (D) as the generated random number and is sent to the write driver 112. Then, the write driver 112 causes the MTJ element, which is designated by the address line (A) in the cell array 31 of the random number generator, to generate a random number based on the data indicating the present state of the MTJ element sent from the register 113. The write driver 112 causes the MTJ element to generate a random number in the following manner. That is, a pulse of random number generating current in the direction of stochastically reversing the MTJ element from the low resistance state (corresponding to the logical value "0") to the high resistance state (corresponding to the logical value "1") is caused to flow through the MTJ element when the current random number sent from the register 113 is "0". Meanwhile, a pulse of random number generating current in the direction of reversing the MTJ element from the high resistance state (corresponding to the logical value "1") to the low resistance state (corresponding to the logical value "0") is caused to flow through the MTJ element when the present random number value sent from the register 113 is "1". The random number generation signal (~W) is restored from "0" to "1", thereby terminating the random number generation processing. In the configuration shown in FIG. 31, the output of the random number value to the data line (D) is maintained until a subsequent instruction to generate and read a random number is made by the random number generation signal (~W).

Upon receiving the instruction to generate and read a random number, the random number generator shown in FIG. 31 outputs the state of the MTJ element at that time as the random number value, and then randomly reverses the state of the MTJ element, thereby generating a subsequent random number. Accordingly, the random number read upon instructing the random number generator to generate and read a random number corresponds to the value generated in the MTJ element upon the previous instruction to generate and read a random number. The random number generated upon instructing the random number generator to generate and read a random number in the MTJ element corresponds to the value read upon the subsequent instruction to generate and read a random number. This embodiment enables shortening of a time interval between reception of an instruction to generate and read a random number and outputting of a new random number value. As a modified example of this mode, a configuration may be adopted in which when an instruction to generate and read a random number is received, the present state of the MTJ element is first randomly reversed to generate a new random number and the state of the MTJ element is then read and output as a random number value.

Each of the random number generators described above can be implemented not only by changing the write current but also by changing the width of the write pulse between when data is written into the MTJ element as a typical memory and when the MTJ element is used for random number generation. In the random number generation, a pulse with a shorter duration than that in the data writing is used to make the switching probability smoothly change with respect to a change of current, thereby reducing variations.

In the embodiments shown in FIGS. 10, 13, 16, 21, 25, 29, 30, and 31, when the cell array has a small number of MTJ elements and reading and generation of random numbers are simultaneously executed on all the MTJ elements, i.e., when the number of MTJ elements is equal to the bit width of the data line (D), there is no need to select an MTJ element using an address. Therefore, the embodiments can be implemented without providing the address line (A) and the address decoder.

The above embodiments exemplify a random number generator using an MTJ element based on a horizontal magnetization method in which the magnetization direction of each of the storage layer and the reference layer of the MTJ element is horizontal to the flow direction of a current (electrons). Alternatively, a random number generator using an MTJ element based on a vertical magnetization method can also be implemented in the same manner.

Moreover, the above embodiments exemplify a random number generator using an MTJ element having a basic configuration in which the tunnel barrier layer is sandwiched between the storage layer and the reference layer. Alternatively, a random number generator using an MTJ element formed of a larger number of layers, which are known to improve the characteristics of the MTJ element, can also be implemented in the same manner.

Note that in order to prevent the state of the MTJ element from changing due to a disturbance after the generation of a random number, error correction and encoding may be performed upon generation of a random number and a parity bit may be written simultaneously.

What is claimed is:

1. A random number generating circuit comprising:
at least one magnetic tunnel junction (MTJ) element configured to come into a high resistance state corresponding to a first logical value and also come into a low resistance state corresponding to a second logical value different from the first logical value; and
a control circuit configured to supply the MTJ element with a first current for stochastically reversing the MTJ element from the high resistance state to the low resistance state when the MTJ element is in the high resistance state, and to supply the MTJ element with a second current for stochastically reversing the MTJ element from the low resistance state to the high resistance state when the MTJ element is in the low resistance state.

2. A circuit comprising:
a magnetic tunnel junction (MTJ) element configured to come into a high resistance state corresponding to a first logical value and also come into a low resistance state corresponding to a second logical value different from the first logical value; and
a control circuit configured to
receive, from an external device, method data for generating of random number indicating whether to stochastically reverse the MTJ element from the high resistance state to the low resistance state or stochastically reverse the MTJ element from the low resistance state to the high resistance state,
supply the MTJ element with a first current for stochastically reversing the MTJ element from the high resistance state to the low resistance state when the method data indicates that the MTJ element is to be stochastically reversed from the high resistance state to the low resistance state, and
supply the MTJ element with a second current for stochastically reversing the MTJ element from the low resistance state to the high resistance state when the method data indicates that the MTJ element is to be stochastically reversed from the low resistance state to the high resistance state.

3. The circuit according to claim 1, wherein
the control circuit includes:
a first reception unit configured to receive, from an external device, a random number generation signal indicating generation of a random number;
a second reception unit configured to receive, from the external device, a read signal indicating reading of the logical value;
a sense amplifier configured to read a logical value corresponding to a state of the MTJ element upon when any one of the random number generation signal and the read signal has been received;
a write driver configured to select one of the first current and the second current according to the logical value read by the sense amplifier upon receiving of the random number generation signal, and to supply the MTJ element with the selected one of the first current and the second current; and
an output unit configured to output to the external device the logical value read by the sense amplifier upon receiving of the read signal.

4. The circuit according to claim 1, wherein
the control circuit includes:
a first reception unit configured to receive, from an external device, a random number generation signal indicating generation of a random number;
a second reception unit configured to receive, from the external device, a read signal indicating reading of the logical value;
a sense amplifier configured to read a logical value corresponding to a state of the MTJ element when the read signal is received;
an output unit configured to output to the external device the logical value read by the sense amplifier upon receiving of the read signal;
a register configured to store the logical value read by the sense amplifier upon receiving of the read signal; and
a write driver configured to select one of the first current and the second current according to the logical value stored in the register when the random number generation signal is received and to supply the MTJ element with the selected one of the first current and the second current.

5. The circuit according to claim 1, wherein
the control circuit includes:
a first reception unit configured to receive, from an external device, a random number generation signal indicating generation of a random number;
a second reception unit configured to receive, from the external device, a read signal indicating reading of the logical value;
a third reception unit configured to receive, from the external device, a write signal indicating data writing;
a fourth reception unit configured to receive, from the external device, write data representing one of the first logical value and the second logical value;
a sense amplifier configured to read a logical value corresponding to a state of the MTJ element when any one of the read signal and the random number generation signal is received;
a write driver configured to
select one of the first current and the second current according to the logical value read by the sense amplifier upon receiving of the random number generation signal and to supply the MTJ element with the selected one of the first current and the second current, and
select one of a third current for reliably reversing the MTJ element from the high resistance state to the low resistance state and a fourth current for reliably reversing the MTJ element from the low resistance state to the high resistance state, according to the write data received by the fourth reception unit when the write signal is received, and to supply the MTJ element with the selected one of the third current and the fourth current; and
an output unit configured to output to the external device the logical value read by the sense amplifier upon receiving of the read signal.

6. The circuit according to claim 1, wherein
the control circuit includes:
a first reception unit configured to receive, from an external device, a random number generation signal indicating generation of a random number;
a second reception unit configured to receive, from the external device, a read signal indicating reading of the logical value;
a third reception unit configured to receive, from the external device, a write signal indicating data writing;

a fourth reception unit configured to receive, from the external device, write data representing one of the first logical value and the second logical value;
a sense amplifier configured to read a logical value corresponding to a state of the MTJ element upon receiving the read signal;
a register configured to store the logical value read by the sense amplifier when the read signal is received;
an output unit configured to output to the external device the logical value read by the sense amplifier upon receiving of the read signal; and
a write driver configured to
select one of a third current for reliably reversing the MTJ element from the high resistance state to the low resistance state and a fourth current for reliably reversing the MTJ element from the low resistance state to the high resistance state, according to the write data received by the fourth reception unit when the write signal is received, and to supply the MTJ element with the selected one of the third current and the fourth current, and
select one of the first current and the second current according to the logical value stored in the register upon when the random number generation signal is received and to supply the MTJ element with the selected one of the first current and the second current.

7. The circuit according to claim 1, wherein the control circuit includes:
a first reception unit configured to receive, from an external device, a random number generation signal indicating generation of a random number;
a sense amplifier configured to read a logical value corresponding to a state of the MTJ element when the random number generation signal is received;
an output unit configured to output the logical value read by the sense amplifier; and
a write driver configured to select one of the first current and the second current according to the logical value read by the sense amplifier and to supply the MTJ element with the selected one of the first current and the second current.

8. The circuit according to claim 1, wherein the control circuit includes:
a first reception unit configured to receive, from an external device, a random number generation signal indicating generation of a random number;
a register configured to store one of the first logical value and the second logical value;
a write driver configured to select one of the first current and the second current according to the logical value stored in the register upon when the random number generation signal is received and to supply the MTJ element with the selected one of the first current and the second current;
a sense amplifier configured to read a logical value corresponding to a state of the MTJ element after the one of the first current and the second current is supplied to the MTJ element; and
an output unit configured to output to the external device the logical value read by the sense amplifier, and
the register stores the logical value read by the sense amplifier.

9. The circuit according to claim 2, wherein the control circuit includes:
a first reception unit configured to receive, from an external device, a random number generation signal indicating generation of a random number;
a second reception unit configured to receive, from the external device, a read signal indicating reading of the logical value;
a fifth reception unit configured to receive the method data from the external device;
a sense amplifier configured to read a logical value corresponding to a state of the MTJ element when the read signal is received;
an output unit configured to output to the external device the logical value read by the sense amplifier; and
a write driver configured to select one of the first current and the second current according to the random number generating method data when the random number generation signal and the method data are received, and to supply the MTJ element with the selected one of the first current and the second current.

10. The circuit according to claim 2, wherein the control circuit includes:
a first reception unit configured to receive, from an external device, a random number generation signal indicating generation of a random number;
a second reception unit configured to receive, from the external device, a read signal indicating reading of the logical value;
a third reception unit configured to receive, from the external device, a write signal indicating data writing;
a fourth reception unit configured to receive, from the external device, write data representing one of the first logical value and the second logical value;
a fifth reception unit configured to receive, from the external device, the method data;
a sense amplifier configured to read a logical value corresponding to a state of the MTJ element when the read signal is received;
an output unit configured to output to the external device the logical value read by the sense amplifier; and
a write driver configured to
select one of a third current for reliably reversing the MTJ element from the high resistance state to the low resistance state and a fourth current for reliably reversing the MTJ element from the low resistance state to the high resistance state, according to the write data received by the fourth reception unit when the write signal is received, and to supply the MTJ element with the selected one of the third current and the fourth current, and
select one of the first current and the second current according to the method data when the random number generation signal and the method data are received, and to supply the MTJ element with the selected one of the first current and the second current.

11. The circuit according to claim 1, wherein the circuit comprises a plurality of the MTJ elements, the control circuit includes:
a sixth reception unit configured to receive, from an external device, address data designating an address of at least one of the MTJ elements; and
an address decoder configured to select an MTJ element corresponding to the address data,
the sense amplifier reads a logical value corresponding to a state of the MTJ element from the MTJ element selected by the address decoder, and the write driver supplies one of the first current and the second current to the selected MTJ element.

12. The circuit according to claim 1, wherein the first logical value is one of a logical value "0" and a logical value "1", and the second logical value is the other of the logical value "0" and the logical value "1".

* * * * *